US012563084B2

(12) United States Patent
Mehrotra et al.

(10) Patent No.: US 12,563,084 B2
(45) Date of Patent: Feb. 24, 2026

(54) GENERATIVE AI OPS FOR CYBER SECURITY THREAT DETECTION

(71) Applicant: Rockwell Automation Technologies, Inc., Mayfield Heights, OH (US)

(72) Inventors: Abhishek Mehrotra, New Berlin, WI (US); Steven P. Taylor, Taylor, WI (US); Jessica L. Wiant, Chagrin Falls, OH (US); Aparna Ravindranath, Mayfield Heights, OH (US); Britney Flores, Mayfield Heights, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 79 days.

(21) Appl. No.: 18/628,904

(22) Filed: Apr. 8, 2024

(65) Prior Publication Data

US 2025/0317464 A1 Oct. 9, 2025

(51) Int. Cl.
*H04L 9/40* (2022.01)

(52) U.S. Cl.
CPC ...... *H04L 63/1433* (2013.01); *H04L 63/1416* (2013.01); *H04L 63/1441* (2013.01)

(58) Field of Classification Search
CPC ............. H04L 63/1433; H04L 63/1416; H04L 63/1441
See application file for complete search history.

(56) References Cited

U.S. PATENT DOCUMENTS

| | | | | |
|---|---|---|---|---|
| 11,790,081 | B2 * | 10/2023 | D'Amato | H04L 63/1466 |
| | | | | 700/28 |
| 12,137,111 | B2 * | 11/2024 | Bassi | H04L 63/1433 |
| 2016/0248800 | A1 * | 8/2016 | Ng | H04L 63/1433 |
| 2016/0330222 | A1 * | 11/2016 | Brandt | H04L 63/1416 |
| 2017/0310690 | A1 * | 10/2017 | Mestha | H04L 63/1441 |
| 2018/0316701 | A1 * | 11/2018 | Holzhauer | H04L 63/1433 |
| 2019/0056722 | A1 * | 2/2019 | Abbaszadeh | H04L 63/1433 |
| 2020/0137090 | A1 * | 4/2020 | Holzhauer | H04L 63/1416 |
| 2023/0058974 | A1 * | 2/2023 | Yan | H04L 63/1441 |
| 2024/0163304 | A1 * | 5/2024 | Gupta | H04L 63/1433 |

* cited by examiner

*Primary Examiner* — Richard G Keehn
(74) *Attorney, Agent, or Firm* — Amin, Turocy & Watson, LLP

(57) ABSTRACT

An industrial security system leverages generative artificial intelligence (AI) to automate the process of identifying software or hardware insecurities on industrial assets, generate recommendations for mitigating these vulnerabilities, and, where appropriate, deploy countermeasures to the vulnerable assets. By leveraging automated asset discovery, real-time asset and network monitoring, and generative AI-assisted vulnerability detection and remediation, the system can reduce the amount of time spent by security administrators in identifying and closing security vulnerabilities within their plant environments, and can alert administrators of potential security issues before those issues become critical.

20 Claims, 14 Drawing Sheets

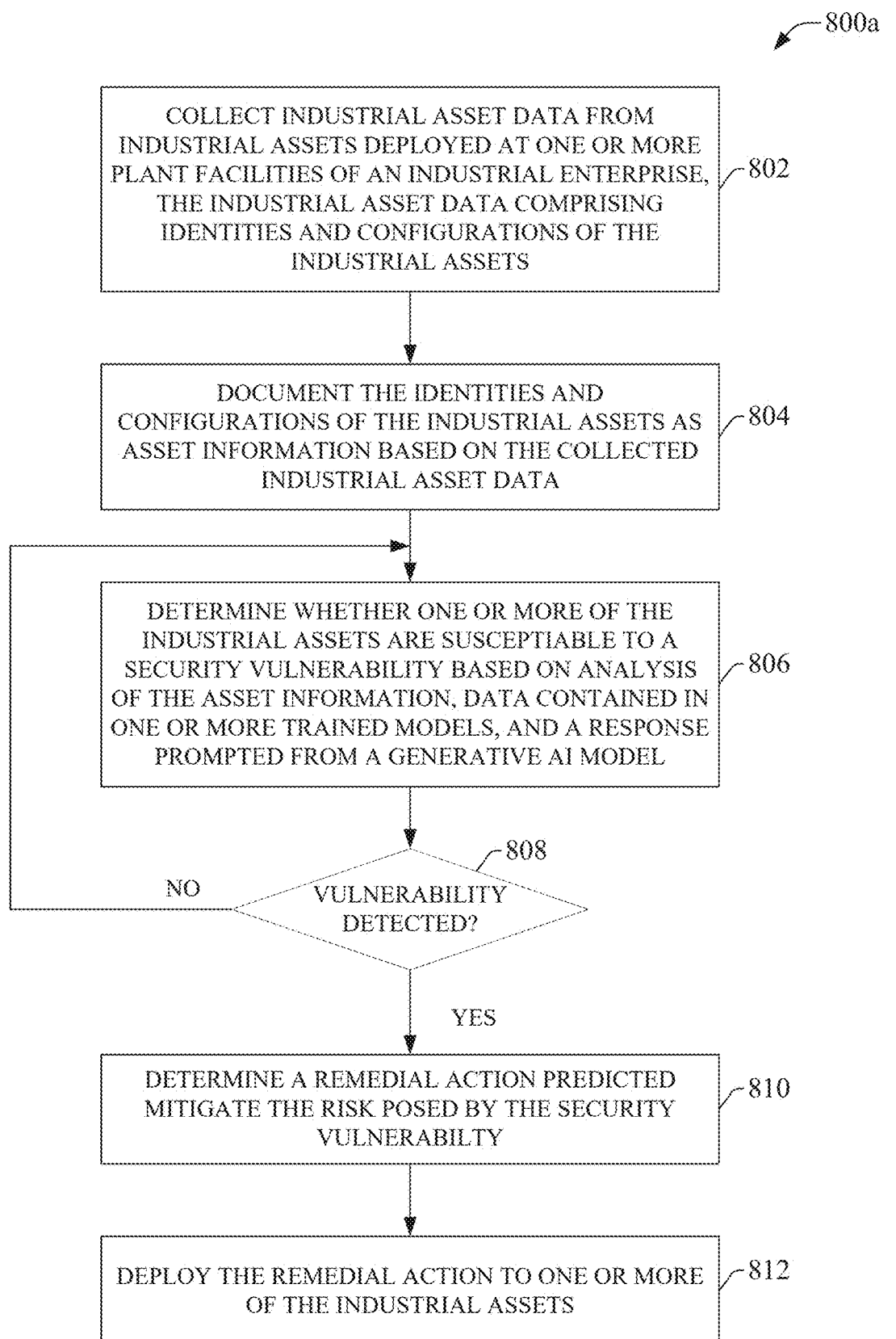

800a

COLLECT INDUSTRIAL ASSET DATA FROM INDUSTRIAL ASSETS DEPLOYED AT ONE OR MORE PLANT FACILITIES OF AN INDUSTRIAL ENTERPRISE, THE INDUSTRIAL ASSET DATA COMPRISING IDENTITIES AND CONFIGURATIONS OF THE INDUSTRIAL ASSETS — 802

DOCUMENT THE IDENTITIES AND CONFIGURATIONS OF THE INDUSTRIAL ASSETS AS ASSET INFORMATION BASED ON THE COLLECTED INDUSTRIAL ASSET DATA — 804

DETERMINE WHETHER ONE OR MORE OF THE INDUSTRIAL ASSETS ARE SUSCEPTIABLE TO A SECURITY VULNERABILITY BASED ON ANALYSIS OF THE ASSET INFORMATION, DATA CONTAINED IN ONE OR MORE TRAINED MODELS, AND A RESPONSE PROMPTED FROM A GENERATIVE AI MODEL — 806

808

NO     VULNERABILITY DETECTED?

YES

DETERMINE A REMEDIAL ACTION PREDICTED MITIGATE THE RISK POSED BY THE SECURITY VULNERABILTY — 810

DEPLOY THE REMEDIAL ACTION TO ONE OR MORE OF THE INDUSTRIAL ASSETS — 812

FIG. 8

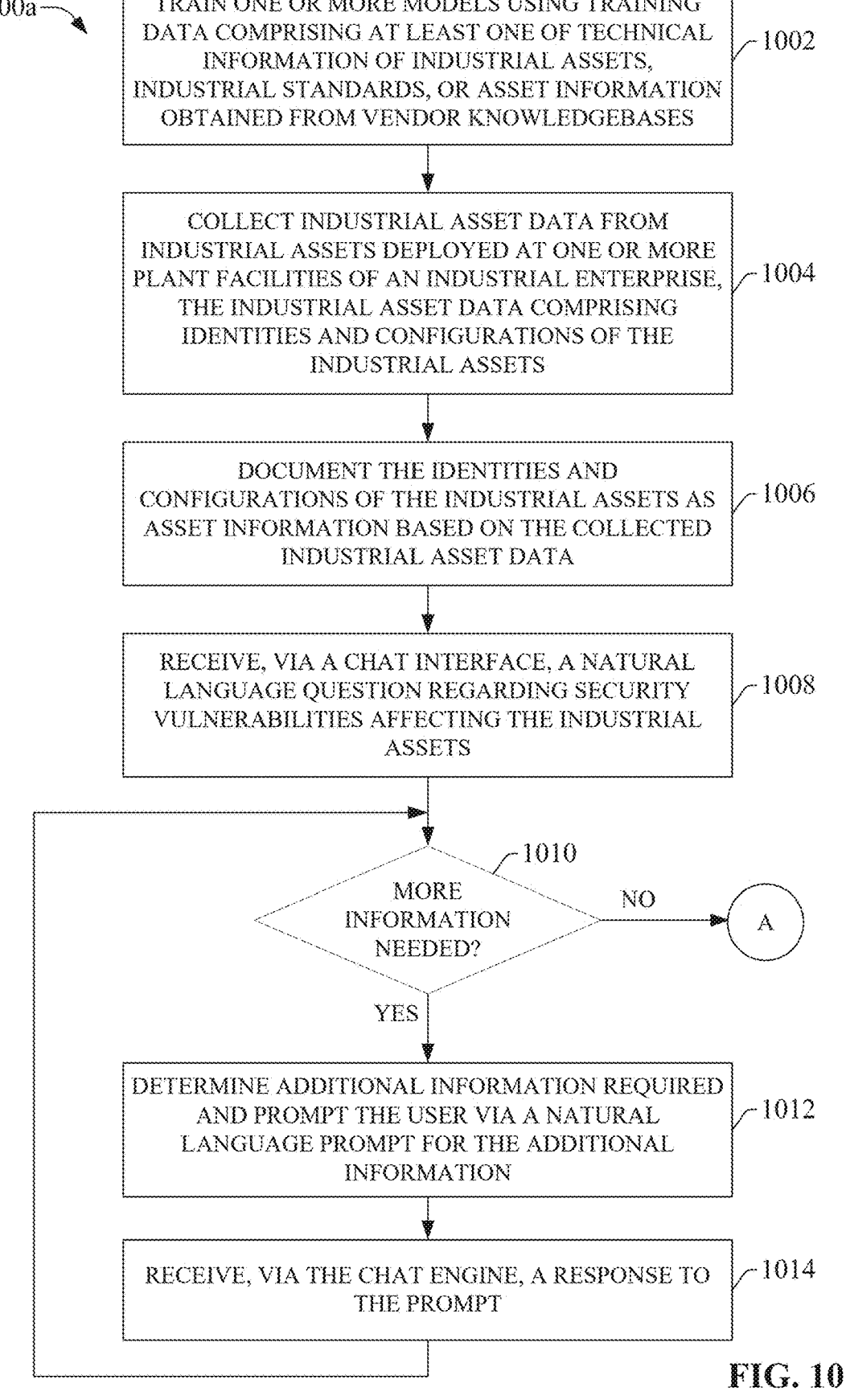

1000a

TRAIN ONE OR MORE MODELS USING TRAINING DATA COMPRISING AT LEAST ONE OF TECHNICAL INFORMATION OF INDUSTRIAL ASSETS, INDUSTRIAL STANDARDS, OR ASSET INFORMATION OBTAINED FROM VENDOR KNOWLEDGEBASES — 1002

COLLECT INDUSTRIAL ASSET DATA FROM INDUSTRIAL ASSETS DEPLOYED AT ONE OR MORE PLANT FACILITIES OF AN INDUSTRIAL ENTERPRISE, THE INDUSTRIAL ASSET DATA COMPRISING IDENTITIES AND CONFIGURATIONS OF THE INDUSTRIAL ASSETS — 1004

DOCUMENT THE IDENTITIES AND CONFIGURATIONS OF THE INDUSTRIAL ASSETS AS ASSET INFORMATION BASED ON THE COLLECTED INDUSTRIAL ASSET DATA — 1006

RECEIVE, VIA A CHAT INTERFACE, A NATURAL LANGUAGE QUESTION REGARDING SECURITY VULNERABILITIES AFFECTING THE INDUSTRIAL ASSETS — 1008

MORE INFORMATION NEEDED? — 1010

NO → A

YES

DETERMINE ADDITIONAL INFORMATION REQUIRED AND PROMPT THE USER VIA A NATURAL LANGUAGE PROMPT FOR THE ADDITIONAL INFORMATION — 1012

RECEIVE, VIA THE CHAT ENGINE, A RESPONSE TO THE PROMPT — 1014

DETERMINE AN ANSWER TO THE QUESTION BASED
ON THE USER'S QUESTION AND RESPONSES,
INFORMATION CONTAINED IN THE ASSET
INFORMATION, THE ONE OR MORE TRAINED
MODELS, AND A RESPONSE PROMPTED FROM A
GENERATIVE AI MODEL

1016

RENDER THE ANSWER TO THE QUESTION ON THE
CHAT INTERFACE

1018

GENERATIVE AI OPS FOR CYBER SECURITY THREAT DETECTION

BACKGROUND

The subject matter disclosed herein relates generally to industrial security, and, more specifically, to detection and remediation of industrial security vulnerabilities.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising a device interface component configured to collect industrial asset data generated by industrial assets in service within an industrial facility, wherein the industrial asset data comprises identity and configuration information for the industrial assets; an analysis component configured to determine, based on analysis of the industrial asset data, whether a subset of the industrial asset data satisfies a condition indicative of a security vulnerability, and in response to determining that the subset of the industrial data satisfies the condition, formulate a remedial action predicted to mitigate a risk associated with the security vulnerability; and a user interface component configured to render, on a client device, information about the security vulnerability and a description of the remedial action, wherein the analysis component is configured to generate a prompt, directed to a generative artificial intelligence (AI) model, designed to obtain a response from the generative AI model that is used by the analysis component to formulate the remedial action.

Also, one or more embodiments provide a method, comprising collecting, by a system comprising a processor, industrial asset data from industrial assets operating within an industrial plant, wherein the industrial asset data comprises identity and configuration information for the industrial assets; determining, by the system based on analysis of the industrial asset data, whether a subset of the industrial asset data satisfies a condition indicative of a security vulnerability, wherein the determining comprises generating a prompt, directed to a generative artificial intelligence (AI) model, designed to obtain a response from the generative AI model comprising information that is used to determine the remedial action; in response to determining that the subset of the industrial data satisfies the condition, determining, by the system, a remedial action predicted to mitigate a risk associated with the security vulnerability; and rendering, by the system on a client device, information about the security vulnerability and a description of the remedial action.

Also, according to one or more embodiments, a non-transitory computer-readable medium is provided having stored thereon instructions that, in response to execution, cause a system to perform operations, the operations comprising collecting industrial asset data from industrial assets operating within an industrial plant, wherein the industrial asset data comprises identity and configuration information for the industrial assets; determining, based on analysis of the industrial asset data, whether a subset of the industrial asset data satisfies a condition indicative of a security vulnerability, wherein the determining comprises generating a prompt, directed to a generative artificial intelligence (AI) model, designed to obtain a response from the generative AI model comprising information that is used to determine the remedial action; in response to determining that the subset of the industrial data satisfies the condition, formulating a remedial action predicted to mitigate a risk associated with the security vulnerability; and rendering, on a client device, information about the security vulnerability and a description of the remedial action.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 8 is a flowchart of an example methodology for discovering and remedying security vulnerabilities within an industrial environment.

FIG. 10a is a flowchart a first part of an example methodology for interacting with an industrial security system via a generative AI chatbot.

DETAILED DESCRIPTION

Figure 1:
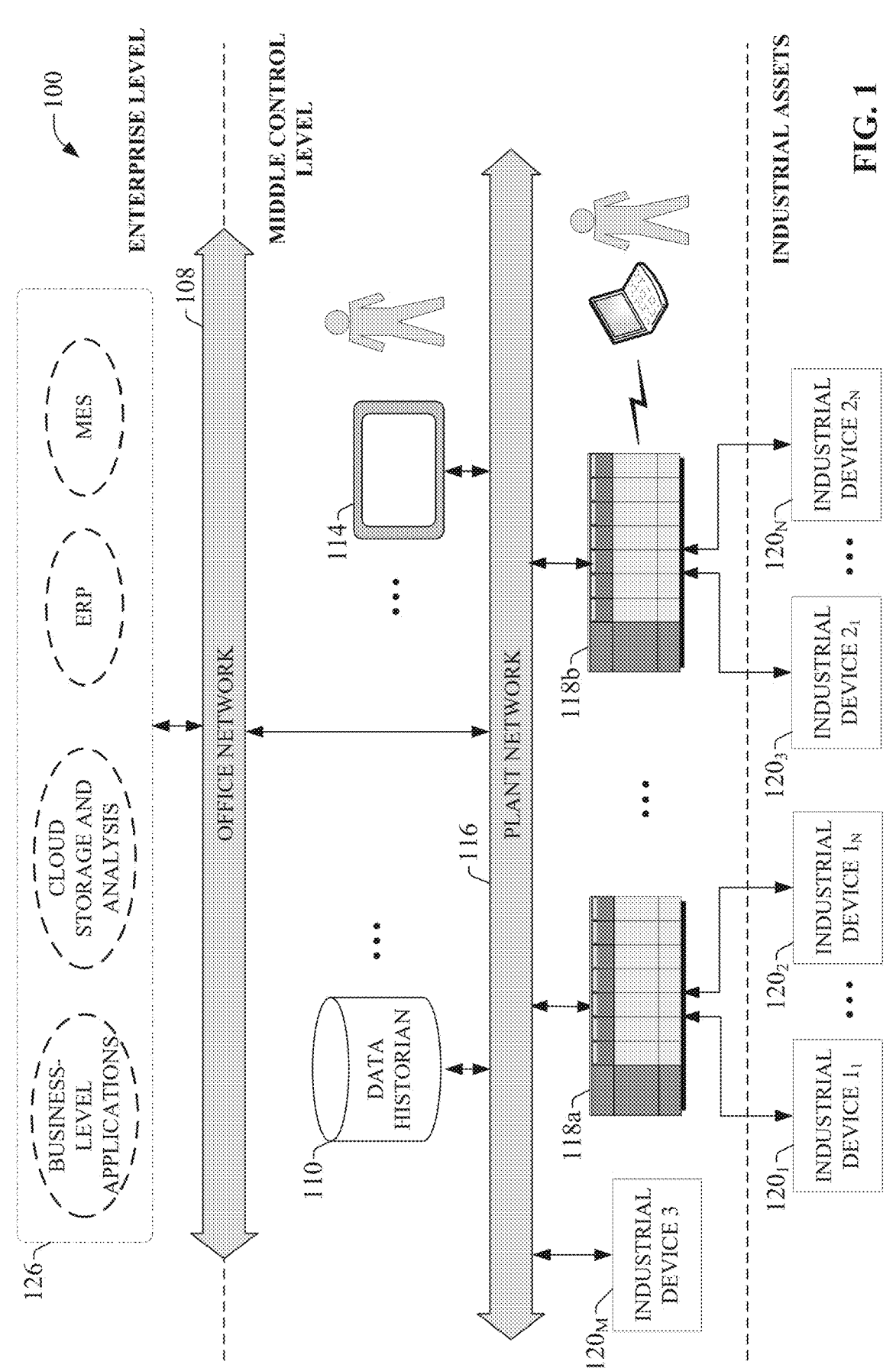
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Industrial devices 120, industrial controllers 118, HMIs 114, associated controlled industrial assets, and other plant-floor systems such as data historians 110, vision systems, and other such systems operate on the operational technology (OT) level of the industrial environment. Higher-level systems 126 may carry out functions that are less directly related to control of the industrial automation systems on the plant floor, and instead are directed to long term planning, high-level supervisory control, analytics, reporting, or other such high-level functions. These systems 126 may reside and operate in the information technology (IT) domain; e.g., on the office network 108, at an external location relative to the plant facility, or on a cloud platform with access to the office and/or plant networks. Higher-level systems 126 may include, but are not limited to, cloud storage and analysis systems, big data analysis systems, manufacturing execution systems (MES), data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

Industrial enterprises typically own and operate many industrial assets, machines, or equipment, which are often located across multiple industrial facilities. If these assets or their associated network infrastructure devices are improperly or insufficiently configured to prevent cyber intrusions or attacks, the resulting security vulnerabilities can be exploited by malicious external entities or threat actors to perform unauthorized device reconfigurations, access sensitive or proprietary information generated by the assets, alter the control sequences carried out by the assets and their associated automation systems, or carry out other such security threats. The network infrastructure devices that facilitate data communication between industrial assets—such as switches, routers, or hubs—may also be vulnerable to performance failures or cyber security threats. While countermeasures or remedies may be available for industrial assets that are at vulnerable to such security threats, managing these asset vulnerabilities typically requires administrators or engineers to identify high-risk assets and apply the appropriate remedies (e.g., software patches, firmware upgrades, device configuration modifications, device or component replacements, etc.).

The number and diversity of industrial assets operated by a given industrial enterprise, which may include assets located at geographically diverse plant facilities or sites, renders the task of identifying, prioritizing, and addressing asset vulnerabilities challenging. The task of managing asset vulnerabilities within the OT environment is hindered by the fact that asset owners may not have a comprehensive view of their collection of industrial assets or the security vulnerabilities associated with those assets.

To address these and other issues, one or more embodiments described herein provide an industrial security system that leverages generative artificial intelligence (AI) to automate the process of identifying software or hardware insecurities on industrial assets, generate recommendations for mitigating these vulnerabilities, and, where appropriate, deploy countermeasures to the vulnerable assets. By leveraging automated asset discovery, real-time asset and network monitoring, and generative AI-assisted vulnerability detection and remediation, the system can reduce the amount of time spent by security administrators in identifying and closing security vulnerabilities within their plant environments, and can alert administrators of potential security issues before those issues become critical.

Figure 2:
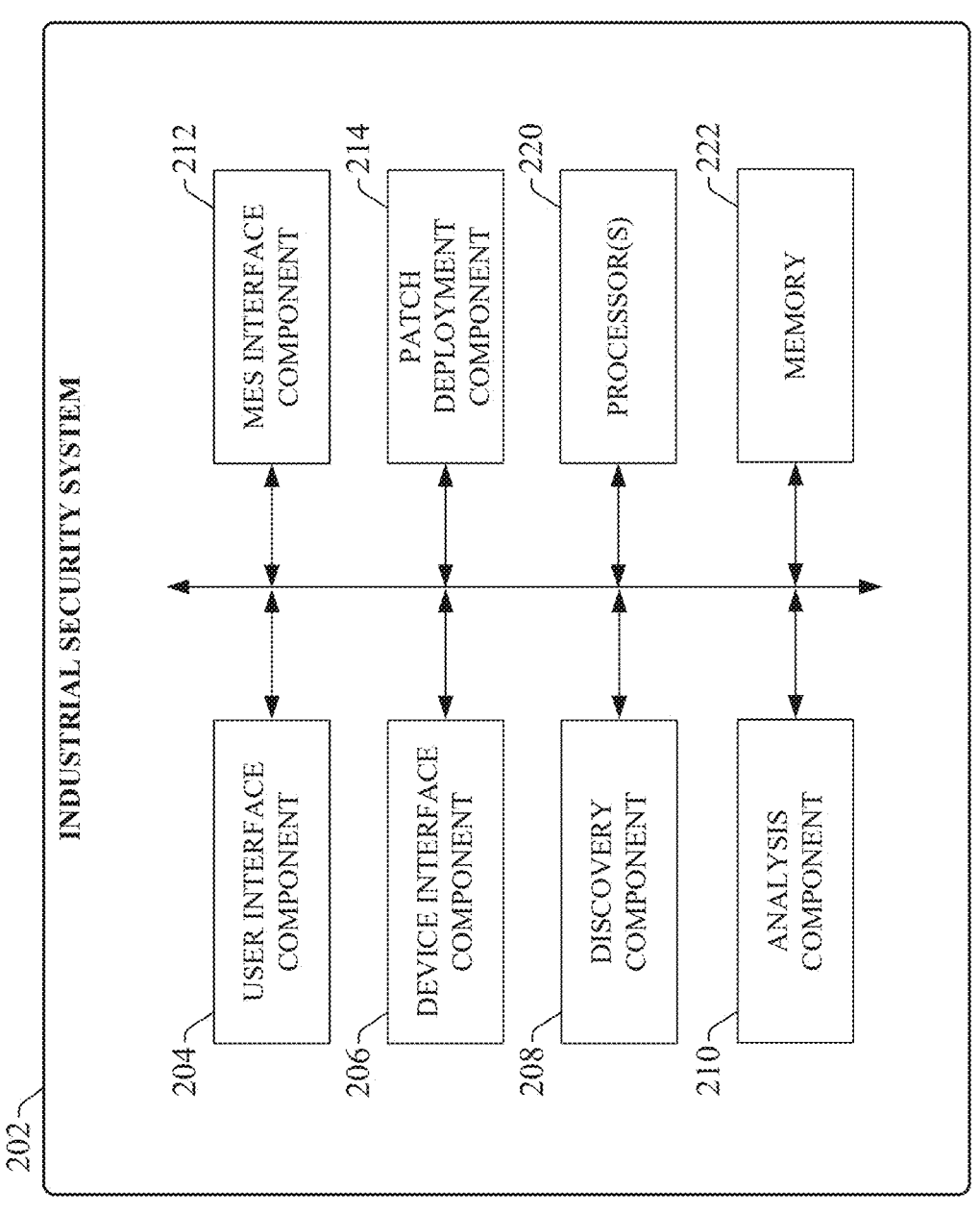
FIG. 2 is a block diagram of an industrial security system.

FIG. 2 is a block diagram of an industrial security system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial security system 202 can include a user interface component 204, a device interface component 206, a discovery component 208, an analysis component 210, an MES interface component 212, a patch deployment component 214, one or more processors 220, and memory 222. In various embodiments, one or more of the user interface component 204, device interface component 206, discovery component 208, analysis component 210, MES interface component 212, patch deployment component 214, the one or more processors 220, and memory 222 can be electrically and/or communicatively coupled to one another to perform one or more of the functions of the industrial security system 202. In some embodiments, components 204, 206, 208, 210, 212, and 214 can comprise software instructions stored on memory 222 and executed by processor(s) 220. Industrial security system 202 may also interact with other hardware and/or software components not depicted in FIG. 2. For example, processor(s) 220 may interact with one or more external user interface devices, such as a keyboard, a mouse, a display monitor, a touchscreen, or other such interface devices.

User interface component 204 can be configured to generate user interface displays that receive user input and render output to the user in any suitable format (e.g., visual, audio, tactile, etc.). In some embodiments, user interface component 204 can render these interface displays on a client device (e.g., a laptop computer, tablet computer, smart phone, etc.) that is communicatively connected to the industrial security system 202 (e.g., via a hardwired or wireless connection). Input data that can be received via user interface component 204 can include, but is not limited to, user interface navigation input, natural language chat inputs (e.g., queries regarding industrial asset risks or security vulnerabilities, requests for recommended asset risk mitigation actions, etc.), or other such input data. Output data rendered by user interface component 204 can include, but is not limited to, information regarding industrial asset vulnerabilities or security risks, recommended countermeasures or actions for mitigating these risks, recommended risk mitigation priorities, estimated costs associated with respective asset vulnerabilities or risks, or other such output data.

Device interface component 206 can be configured to interface with industrial devices or assets on the plant floor, either directly or via a gateway or edge device, and receive real-time operational and status data from these assets for the purposes of asset security monitoring and analysis. Discovery component 208 can be configured to discover, identify, and document industrial assets that are in operation within one or more industrial facilities owned by an industrial enterprise or customer.

Analysis component 210 can be configured to perform analysis on real-time or historical asset performance data, asset information documented by the discovery component 208, data obtained from an MES system or a similar high-level enterprise tracking system, product vulnerability information issued by industrial asset vendors, or other such data to identify industrial asset security vulnerabilities or risks in real-time, to formulate recommended vulnerability mitigation actions for addressing these vulnerabilities, to determine and assign priorities to these vulnerability mitigation actions, or to generate other information relating to industrial asset threat detection. In some embodiments, the analysis component 210 can apply AI-assisted or generative AI-assisted analysis to this data in connection with determining when and how asset risk mitigation actions should be implemented.

MES interface component 212 can be configured to retrieve information from an MES system, or another high-level or business system operated by the industrial enterprise, that can be used by the discovery component 208 in connection with identifying and documenting the customer's industrial assets, or by the analysis component 210 in connection with identifying and mitigating asset insecurities. The patch deployment component 214 can be configured to deploy risk mitigation patches—in the form of software, configuration data, or control instructions—to an industrial asset, where these patches are designed to reduce or mitigate a security risk or vulnerability identified for the asset. Example risk mitigation patches can comprise, for example, a software patch, a firmware update, a device configuration modification (e.g., updated device configuration settings), a modification to a control sequence executed by the asset or an associated industrial controller that monitors and controls the asset, or other such mitigation data.

The one or more processors 220 can perform one or more of the functions described herein with reference to the systems and/or methods disclosed. Memory 222 can be a computer-readable storage medium that stores computer-executable instructions and/or information for performing the functions described herein with reference to the systems and/or methods disclosed.

Figure 3:
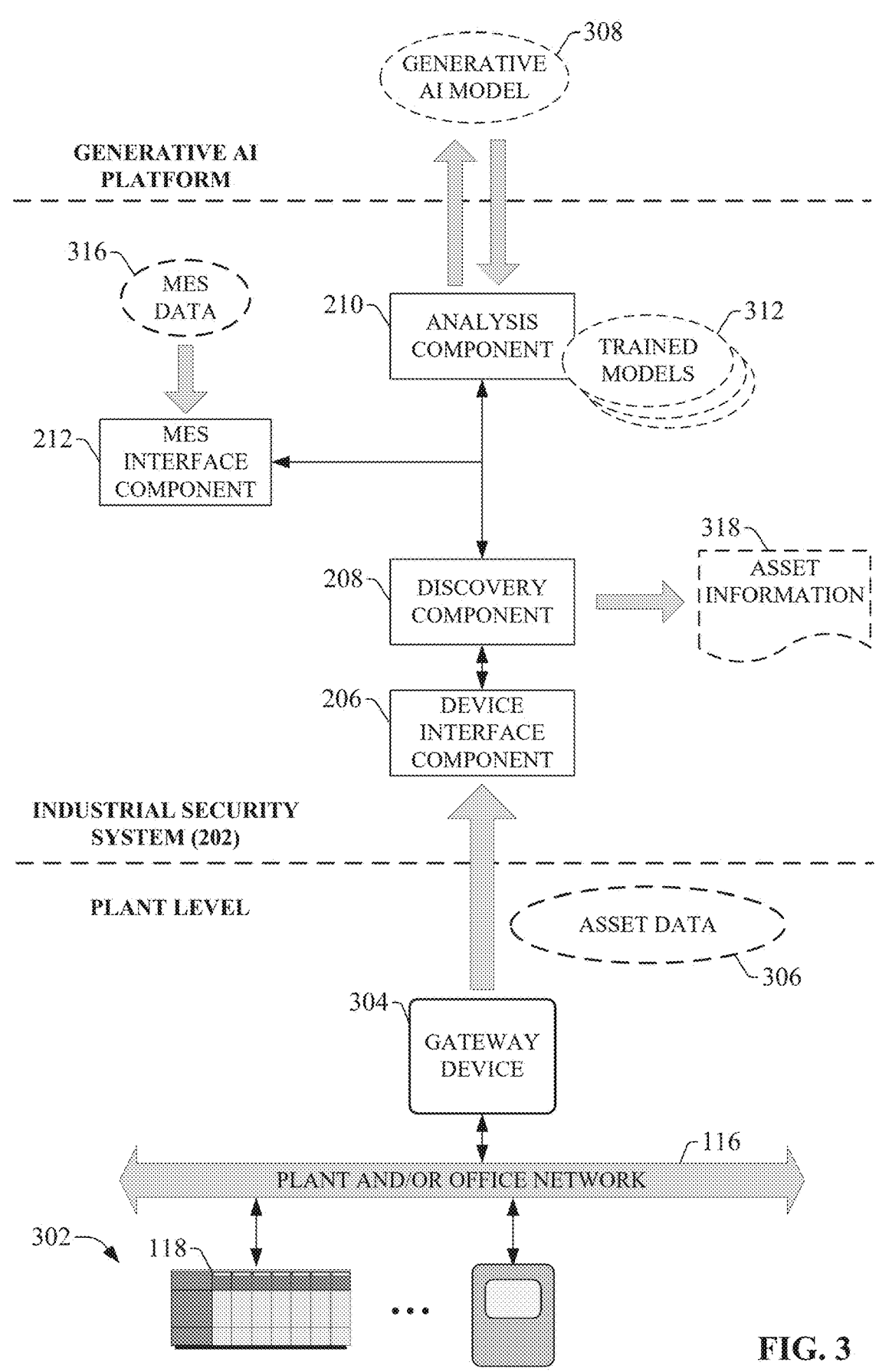
FIG. 3 is a diagram illustrating an example architecture for discovering and documenting industrial assets using the industrial security system.

FIG. 3 is a diagram illustrating an example architecture for discovering and documenting industrial assets 302 using the industrial security system 202. Industrial security system 202 can be implemented on any suitable platform that allows the system 202 to be accessed via client devices (e.g., desktop computers, laptop computers, smart phones, tablet computers, wearable computing devices, etc.) and that permits the system 202 to access operational and status data generated by industrial assets 302 within one or more plant facilities. For example, system 202 can be installed and executed on an on-premise server device residing on a plant or office network of an industrial facility. Alternatively, system 202 can be executed on a cloud platform as a set of cloud-based services, allowing customers associated with different industrial enterprises to access the system 202; receive dashboards or other user interfaces that render information about the customers' assets, their associated risks, and recommended risk mitigation strategies; interrogate the system 202 regarding asset insecurities and mitigation measures via a natural language chatbot interface; or otherwise engage with the industrial security system 202. System 202 can also be executed on a public network such as the internet and made accessible to users having suitable authorization credentials. In such embodiments, the system 202 can maintain asset and risk information for different industrial enterprises in a segregated manner, such that employees of a given industrial enterprise can only access asset and risk data associated with that enterprise. In the example depicted in FIG. 3, industrial security system 202 resides and executes on a cloud platform.

In the example architecture of FIG. 3, a gateway device 304 resides on the same plant network 116 as the industrial assets 302 associated with automation systems on the plant floor of an industrial facility. These industrial assets 302 can include, for example, industrial controllers 118, motor drives, HMI terminals, telemetry devices (e.g., flow meters, pressure meters, temperature meters, etc.), sensors of various types (e.g., photo-sensors, proximity sensors, etc.), or other such industrial devices. Industrial assets 302 can also comprise the machines that make up industrial automation systems that are monitored and controlled using the industrial devices. During operation of the plant's automation systems, gateway device 304 collects asset data 306 from the industrial assets 302. This data 306 can include information generated by the assets 302 during operation, such as data values read from data tags, data registers, or automation objects defined on one or more industrial controllers 118; measured data from analog or digital sensors; telemetry data from telemetry devices or meters; device or system alarm information; or other such operational data. Asset data 306 can also include data about the assets 302 themselves, such as model and vendor information, device configuration information (e.g., network addresses such as internet protocol (IP) addresses, network settings, mode settings, communication parameters, I/O configuration settings, etc.), machine access control (MAC) addresses, or other such data. In general, asset data 306 can represent identity, status, operational, performance, or configuration data for the industrial assets 302.

The industrial assets 302 can also include network infrastructure devices of any plant networks over which industrial devices or assets 302 communicate. These network infrastructure devices can include, for example, network switches, routers, hubs, firewall devices, or other such devices. Asset data 306 collected for these network devices can include, for example, device model and vendor information, device parameter settings, network addresses, MAC addresses, data port communication statistics, network traffic statistics, or other such data.

In some embodiments, gateway device 304 can contextualize the collected data 306 prior to delivering the data to the industrial security system 202 and deliver the processed data to the system 202 as contextualized data. This contextualization can include time-stamping the data, as well as normalizing or otherwise formatting the collected data for analysis by the industrial security system 202. In general, gateway device 304 serves as an edge device that interfaces data from the set of industrial assets 302 to either the industrial security system 202 or a separate data storage platform accessible to the industrial security system 202. The industrial security system's device interface component 206 can remotely interface with the gateway device 304 to receive the collected asset data 306. Although FIG. 3 depicts collection of asset data 306 by the device interface component 206 via an on-premise gateway device 304, other architectures for migrating asset data 306 to the industrial security system 202 for monitoring and analysis are also within the scope of one or more embodiments.

In general, the industrial security system 202 implements two phases of asset risk analysis—asset inventory and asset monitoring. FIG. 3 illustrates the process of inventorying an industrial enterprise's industrial assets based on examination of collected or discovered asset data 306. According to one approach for identifying and recording a customer's industrial assets 302, the system's discovery component 28 can analyze asset data 306 collected by the device interface component 206 to identify industrial assets 302 in use within the facility, and record information about these discovered assets as asset information 318. Since the industrial security system 202 is a multi-tenant system that provides security monitoring services for multiple industrial customers, the discovery component 208 can maintain segregated sets of asset information 318 for each industrial customer or enterprise registered to use the system 202. The asset information 318 generated by the discovery component 208 can record the identities and types of the discovered assets 302 (e.g., industrial controllers, telemetry devices, data historians, industrial machines, industrial robots, network infrastructure devices, motor drives, etc.), the vendor and model number of the assets 302, the customer locations in which these assets 302 reside and operation (e.g., the industrial facilities or sites at which the assets are installed), configuration settings of the assets 302 (e.g., operating modes, I/O configurations, enabled device features, control functions, etc.), firmware versions installed on the assets 302, any virus protection software or other types of security software installed on the assets 302, access permissions defined for respective assets 302, digital certificates associated with the assets 302, or other such asset information.

In the case of assets 302 that are network infrastructure devices or that have network configuration settings for communication on a plant network, the asset information 318 can include the assets' network settings, network addresses, communication port configuration settings, firewall parameters, network workgroups defined for the assets 302, network device rules or policies, or other such network configuration information.

In some embodiments, in addition to the collected asset data 306, the discovery component 208 can also leverage other sources of asset information in order to identify industrial assets 302 deployed at a given customer facility, discover information about the assets 302, or learn functional relationships between the assets 302. For example, some embodiments of the industrial security system 202 can include an MES interface component 212 configured retrieve MES data 316 from the industrial enterprise's MES system or another high-level plant managements system. The discovery component 208 can determine whether this MES data 316 identifies any assets 302 that are in use within the industrial enterprise and update the enterprise's asset information 318 to record this asset data.

In addition to the identities and configurations of a customer's industrial assets 302, some embodiments of the discovery component 208 can identify and record information about the functional and network architecture of the customer's collection of industrial assets 302. This can include, for example, identifying and recording network mapping information representing network connections between the assets 302 and associated network infrastructure devices. The discovery component 208 can also discover or learn network traffic characteristics of respective segments of the plant network on which the industrial assets 302 reside, and record these network traffic characteristics as baseline characteristics for the purposes of anomaly detection. These learned network traffic characteristics can include data traffic patterns or network bandwidth utilizations typically experienced during normal operation of the assets 302. In some embodiments, the discovery component 208 can determine and record expected network traffic characteristics for respective different operating modes of the industrial assets 302 or their associated automation systems, since the data traffic bandwidths and patterns may be at least partially a function of these various operating modes.

In some embodiments, the system's analysis component 210 can enhance the customer's asset information 318 with additional details about the customer's assets 302 obtained using generative AI techniques. In such embodiments, the analysis component 210 can implement prompt engineering functionality using associated models 312 trained with various types of training data, and can use these prompt engineering features to interface with a generative AI model 308 and associated neural networks. In various embodiments, the generative AI model 308 can be any of a diffusion model, a variational autoencoder (VAE), a generative adversarial network (GAN), a language-based generative model such as a large language model (LLM), a generative pre-trained transformer (GPT), a long short-term memory (LSTM) network, or other such models As will be discussed in more detail below, the analysis component 210 can also leverage generative AI in connection with identifying security vulnerabilities or threats on the customer's industrial assets 302 in real time.

Figure 4:
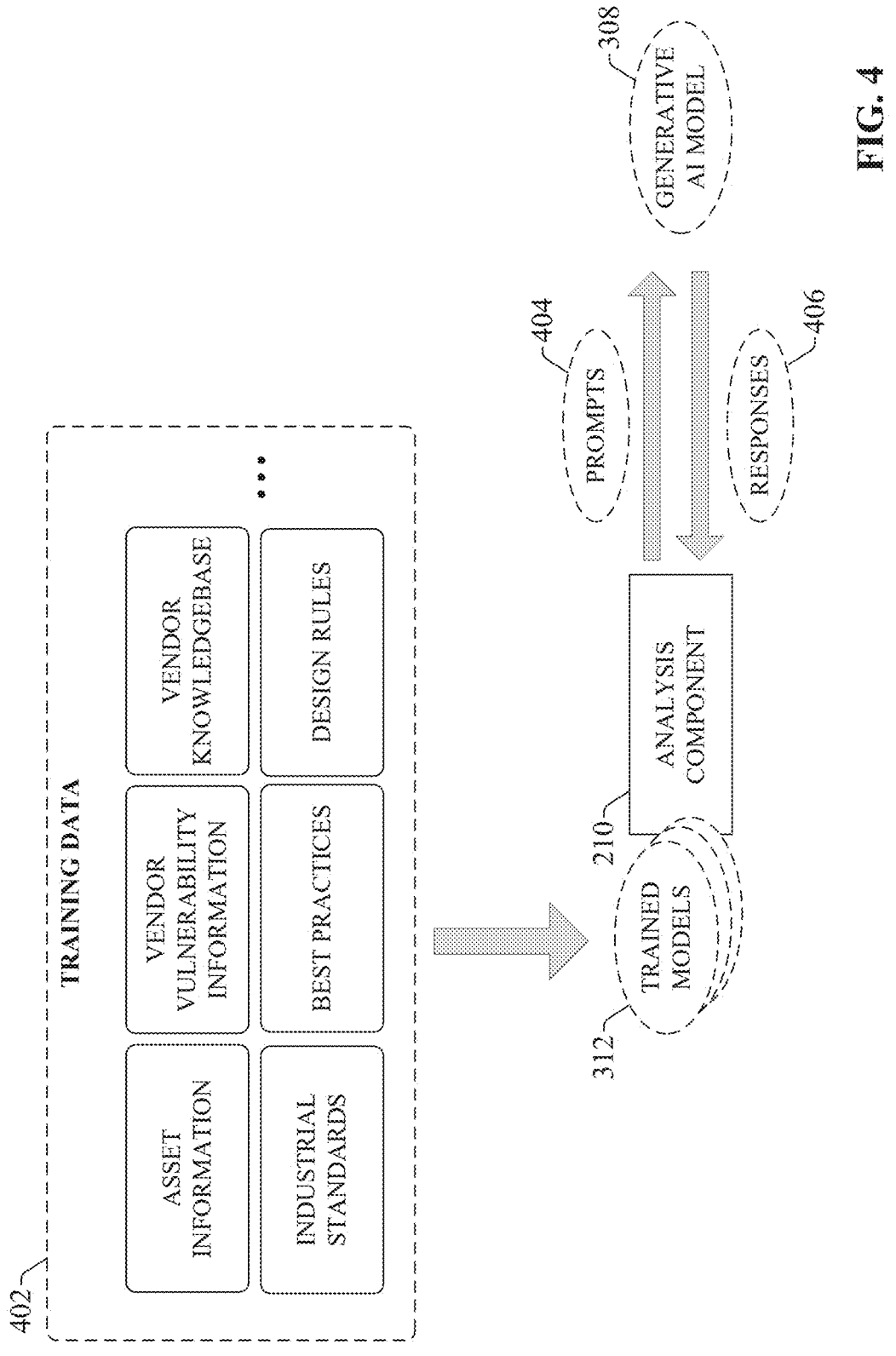
FIG. 4 is a diagram illustrating training of models used by some embodiments of the industrial security system.

FIG. 4 is a diagram illustrating training of the models 312 used by some embodiments of the analysis component 210. Models 312 can be trained using training data 402 relevant to the industrial space, industrial assets, industrial applications, standards and best practices, or other such domain-specific training data. Such training data 402 can include, but is not limited to, knowledge or technical specifications of industrial assets, machines, and devices; information defining industrial standards (e.g., global or vertical-specific safety standards, food and drug standards, design standards such as the ISA-88 standard, etc.); information regarding recommended best practices for industrial design or safety; asset information obtained from vendor knowledgebases; technical specifics or design standards for various types of industrial control applications (e.g., batch control processes, die casting, valve control, agitator control, etc.); knowledge of specific industrial verticals; control design rules; or other such data 402.

In some cases, the discovery component 208 can identify and document a given industrial asset 302 as part of asset information 318 based solely on the discovered asset data 306 and other information sources, such as MES data 316 or the training data 402 encoded in the trained models 312, without accessing the generative AI model 308. However, the analysis component 212 can also, as needed, interact with the generative AI model 308 in connection with identifying and documenting an industrial enterprise's industrial assets 302. For example, if the discovery component 208 discovers that a subset of the collected asset data 306 identifies a particular type of industrial asset or device executing at a customer's industrial facility, the analysis component 210 can obtain supplemental information about the discovered asset type by formulating and submitting a prompt 404 to the generative AI model 308 designed to obtain a response 406 from the generative AI model 308 containing this supplemental information. This supplemental asset information can comprise, for example, capabilities or features of the identified asset, known security vulnerabilities associated with the asset, adjustable configuration parameters associated with the asset, vendor or model information for the asset, or other such information.

The analysis component 210 can generate these prompts 404 based on relevant subsets of the collected asset data 306 (e.g., identification information for the discovered assets 302) as well as the training data 402 encoded in the trained models 312. The analysis component 210 can reference the trained models 312 or associated training data 402 as needed in connection with formulating prompts 404 designed to obtain responses 406 from the generative AI model 308 that assist the analysis component 210 in comprehensively documenting discovered assets 302 as part of the asset information 318 maintained for each industrial customer. The analysis component 210 can generate the prompt 404 to include any relevant information that can assist the generative AI model 308 in providing useful responses 406 that can be used to supplement the asset information 318, including but not limited to a selected subset of the asset data itself 306 (e.g., an identity of the industrial asset or the asset's type), an indication of the type of industrial process or application being carried out by the industrial asset (e.g., a specific type of batch processing, a specific automotive manufacturing function, a sheet metal stamping application, etc.), any selected subsets of the training data 402 or MES data 316, or other such data.

Figure 5:
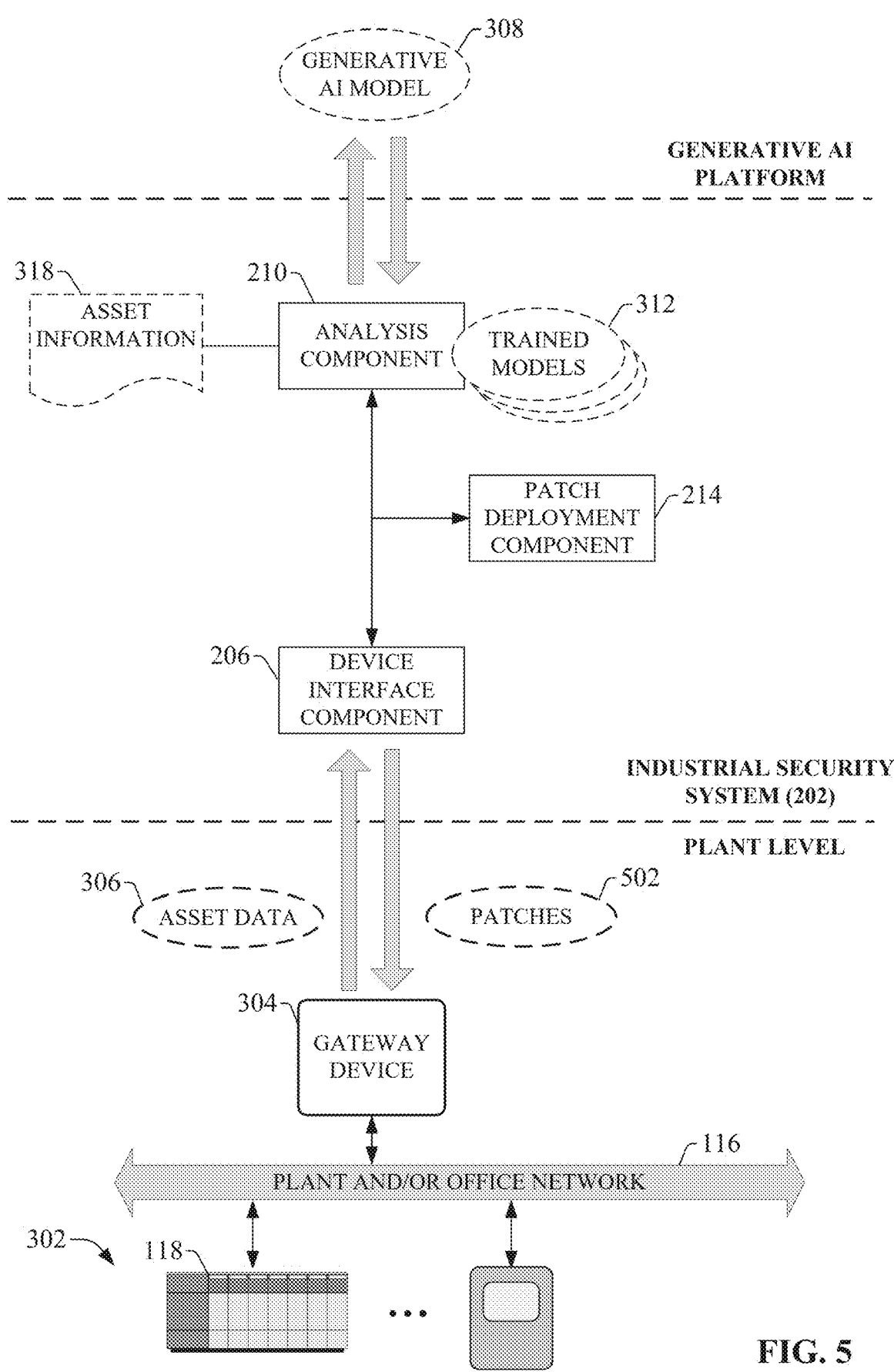
FIG. 5 is a diagram illustrating security vulnerability monitoring and automated risk mitigation for industrial assets.

Once the industrial security system 202 has discovered and documented a customer's industrial assets 302 as asset information 318, the system 202 can perform real-time security risk monitoring for the assets 302. FIG. 5 is a diagram illustrating security vulnerability monitoring and automated risk mitigation for industrial assets 302. During plant operations, the device interface component 206 can continue to collect asset data 306 generated by the industrial asset 302 and associated network infrastructure devices on a substantially real-time basis, and the analysis component 210 can analyze this asset data 306 based on the previously established asset information 318, as well as relevant subsets of the training data 402 encoded in the trained models 312, to identify potential security vulnerabilities or threats based on this analysis. The analysis component 210 can identify security vulnerabilities or threats based on such factors as known security vulnerabilities for specific asset models reported by the vendors of those assets, detected deviations from learned baselines of plant network traffic patterns or bandwidth utilization, responses prompted from the generative AI model 308, or other such information. Example security vulnerabilities that can be detected in this manner can include, but are not limited to, outdated device firmware or other outdated software installed on a device that leaves the device vulnerable to unauthorized access or manipulation by unauthorized users or entities, device configuration settings (e.g., network settings, security settings, data port settings, etc.) that can allow unauthorized access or manipulation by unauthorized users or entities, insecurities in the plant network architecture designs that may permit access to the industrial assets 302 by unauthorized parties, or other such vulnerabilities.

In an example scenario, the analysis component 210 can identify a security vulnerability associated with an asset 302 based on a comparison between a firmware version or device configuration setting recommended by a vendor of the asset 302 for mitigating a known security vulnerability and the actual firmware version or device configuration settings implemented on the customer's asset 302. The analysis component 210 can determine the recommended firmware version or device configuration setting from any suitable information source, including but not limited to the training data 402 encoded in the trained models 312 (which may be updated as needed to include asset vulnerability information and countermeasures published by the vendor), a vendor knowledgebase or another public database containing published vendor security information, responses 406 prompted from the generative AI model 308, or other such sources. If the analysis component 210 determines that the firmware or configuration settings of the customer's asset 302 (as recorded in the asset information 318) do not comply with the vendor's recommended security vulnerability countermeasure, the analysis component 210 identifies this scenario as a security vulnerability for which a security countermeasure is recommended.

As an alternative to direct comparison between recommended and actual firmware versions or device configuration settings, the analysis component 210 can also infer the presence of a security vulnerability due to the firmware version or configuration settings implemented on an asset 302 based on analysis of the asset information 318 (including the asset's identity and configuration information, as well as a function or context of the asset 302 within the customer's manufacturing operations) together with a relevant subset of information contained in the trained models 312 and, if necessary, responses 406 prompted from the generative AI model 308. This analysis can determine whether the asset's configuration, within the context of the industrial application within which the asset operates, is subject to a security vulnerability that puts either itself or other assets 302 at risk of unauthorized intrusions or attacks by external threat actors.

In another example the analysis component 210 can monitor portions of asset data 306 that report network data traffic patterns, or amounts of network bandwidth utilization, currently being experienced on one or more segments of the customer's plant network, and compare these data traffic patterns or bandwidth usages with the learned baseline patterns and bandwidth consumptions recorded in the asset information 318 by the discovery component 208. In response to detecting that a current data traffic pattern reported by the asset data 306 deviates from the learned baseline pattern by a defined degree, or that the current amount of network bandwidth being utilized deviates from the learned baseline bandwidth consumption in excess of a defined threshold, the analysis component 210 identifies this event as a potential security threat or cyber attack.

The analysis component 210 can also identify other types of anomalous asset behavior that may be indicative of unauthorized malicious activity by a threat actor (e.g., an unauthorized modification to a control sequence for a machine or an automation system). In general, based on analysis that considers real-time asset data 306 collected from the industrial assets 302, recorded asset information 318, information contained in the trained models 312 (or other sources of the training data 402 discussed above), and, as needed, responses 406 prompted from the generative AI model 308, the analysis component 210 can identify various types of conditions indicative of either a security vulnerability that can potentially be exploited by external threat actors, or indicative of a possible present and ongoing cyber attack requiring immediate remedial action.

During this security monitoring phase, the analysis component 210 can prompt the generative AI model 308 as needed for responses 406 that can assist in determining whether a detected scenario is to be deemed a security vulnerability or a potential cyber attack. In such embodiments, the analysis component 210 can formulate prompts 404 designed to obtain, as responses 406 from the generative AI model 308, additional relevant information about a scenario detected by the analysis of the asset data 306 or the documented asset information 318. Such prompts 404 can be formulated to obtain, from the generative AI model 308, such information as recommended security settings for an industrial asset or network infrastructure device, information regarding whether an observed network data traffic pattern corresponds to a pattern known to be cause by a specific type of cyber attack, information regarding known security vulnerabilities associated with a particular model of industrial device recorded in the asset data 306, or other such information. The analysis component 210 can assess these responses 406 as part of the system's real-time security vulnerability monitoring process to assist in identifying potential or present security threats.

In some embodiments, in response to detection of a security vulnerability or potential cyber attack, the industrial security system 202 can initiate automated remedial actions designed to mitigate the detected vulnerability or to otherwise reduce the risk associated with the vulnerability. The remedial actions taken by the system 202 can depend on the type of the detected vulnerability. For example, for asset vulnerabilities that can be mitigated by installing updating software or modifying the asset's configuration settings, the system's patch deployment component 214 can remotely implement these updates or modifications as patches 502 deployed to the relevant industrial assets 302. These patches 502 can, for example, modify an asset's access permissions (e.g., re-defining which other assets, devices, or personnel are permitted to access or communicate with the asset 302), update an asset's digital certificates or key-based security, modify an asset's network address, update an asset's firmware version, modify an asset's configuration settings (including the asset's networking, data port, or security settings), modify firewall parameters, modify whitelists that explicitly define which devices are permitted to exchange data with a given asset 302, or implement other such risk mitigation actions. The analysis component 210 can determine a suitable remedial action to mitigate a given security vulnerability based on such information as an asset vendor's recommendation for addressing a known security vulnerability (as obtained from a vendor knowledgebase or from the trained models 312), responses 406 prompted from the generative AI model 308 describing approaches for addressing the security vulnerability, information regarding countermeasures applied by other industrial customers for addressing a similar security vulnerability, or other such information.

In the case of determining suitable vulnerability countermeasures using generative AI, the analysis component 210 can formulate a prompt 404 designed to obtain recommendations for eliminating or mitigating the discovered vulnerability, and submit this prompt 404 to the generative AI model 308. Such prompts 404 can include such information as the type, vendor, or model of the industrial asset 302 affected by the vulnerability; the nature of the discovered vulnerability, any network architecture information obtained from the asset information 318 that may be relevant to the proposed remedial action (e.g., the location of the asset 302 on the plant network, identities and configurations of any network infrastructure devices located between the asset 302 and external public networks, etc.), or other such information. Based on this prompt 404, the generative AI model 308 can return a response 406 containing information that can be used by the analysis component 210, alone or in combination with other information described above, to formulate suitable remedial actions for mitigating the vulnerability.

Automating the deployment of risk mitigation patches 502 in response to detection of a security vulnerability or potential cyber attack can reduce the amount of time that the assets 302 remain vulnerable to detected security threats. In some embodiments, if deployment of a patch 502 to a given industrial asset 302 requires the asset 302 to be temporarily disabled (e.g., to reboot the asset 302 so that the software or configuration updates take effect), the patch deployment component 214 can determine, based on monitoring of the asset data 306, a suitable time at which to deploy the patch 502 to the asset 302—e.g., a time at which disablement of the asset 302 will not negatively impact manufacturing operations performed by the asset 302—and deploy the patch 502 at this determined time.

Figure 6:
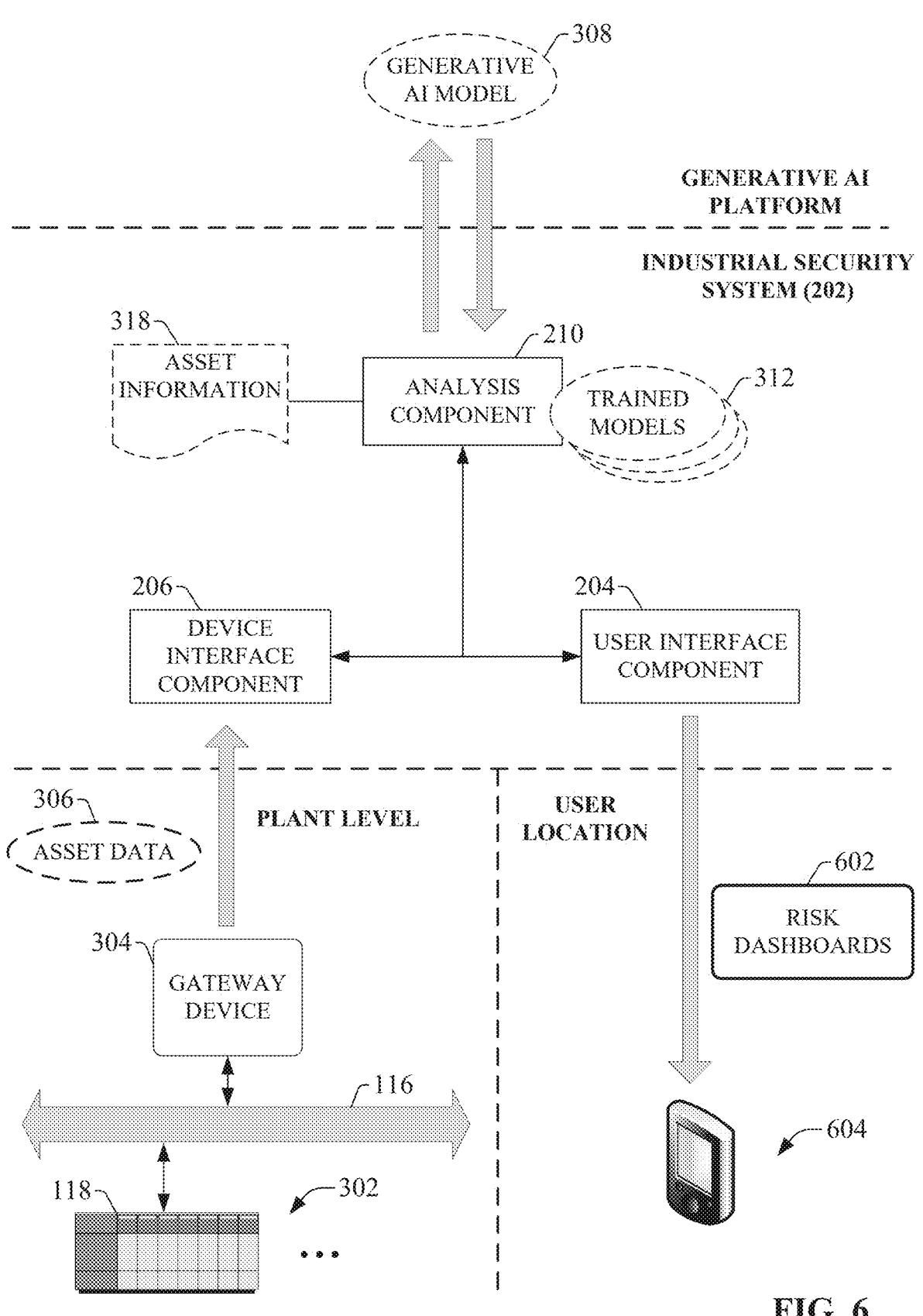
FIG. 6 is a diagram illustrating generation and delivery of risk dashboards to a client device of an employee of the industrial enterprise.

In addition to, or as an alternative to, automated deployment of patches 502 or other remedial actions in response to detection of security vulnerabilities or threats, the industrial security system 202 can generate and render dashboards or other graphical interfaces that display information about an industrial enterprise's security vulnerabilities, recommended actions to be taken to mitigate these vulnerabilities, and risk levels associated with each discovered vulnerability. FIG. 6 is a diagram illustrating generation and delivery of risk dashboards to a client device 604 of an employee of the industrial enterprise. After the customer's industrial assets 302 have been inventoried and documented as asset information 318, and the analysis component 210 has identified security vulnerabilities or threats associated with one or more of the assets 302 as described above, the user interface component 204 can generate and render, on client device 604, a risk dashboard 602 that presents information about the discovered vulnerabilities and recommended remedial actions, as determined by the analysis component 210. For a given security vulnerability, the risk dashboard 602 can present such information as a description of the vulnerability, identities of the assets 302 affected by the vulnerability, a description of the risk posed by the vulnerability (e.g., a predicted impact on manufacturing operations, a predicted safety risk, a predicted cost associated with vulnerability, etc.), a description of recommended remedial actions to be taken to mitigate the vulnerability (e.g., any of the actions described above as being implemented via patches 502, a recommended modification to an automation system control routine to reduce or eliminate the risk posed by the vulnerability, installation of a firewall or another security device at a specified location on the plant network, etc.), or other such information.

The analysis component 210 can also prioritize an industrial enterprise's discovered vulnerabilities based on the predicted risks posed by the vulnerabilities, or the impact that exploitation of those vulnerabilities by malicious actors would have on manufacturing, safety, or business concerns, and the user interface component 204 can convey this prioritization via the risk dashboards 602. In general, the analysis component 210 can determine relative priorities for the discovered vulnerabilities based on such factors as predicted severities of the vulnerabilities' worst-case scenarios, immediacies of the threats posed by the vulnerabilities (e.g., potential security concerns versus active anomalies indicative of a possible security attack), existing risk mitigation factors that may already be in place (e.g., it may be determined that a vulnerable asset located behind a firewall merits a lower priority than another vulnerable asset that is not protected by a firewall), the relative criticalities of the assets 302 to the manufacturing process (where an industrial asset that is highly critical to manufacturing operations may merit a higher priority than an asset that performs less important secondary functions), or other such factors. In some cases, the risk dashboards 602 may display these prioritizations as a ranked list of risk mitigation tasks ordered in accordance with the relative priorities. Alternatively, the risk dashboards 602 may describe, for each discovered vulnerability, a recommended timing at which the corresponding remedial action should be performed, which is a function of the relative severities of the active vulnerabilities. For example, the system 202 may recommend that security vulnerabilities having a high level of associated risk or cost should be performed immediately, vulnerabilities having an intermediate level of risk can be remedied during the next available plant shutdown, and that low-risk vulnerabilities can be addressed on an optional basis.

Figure 7:
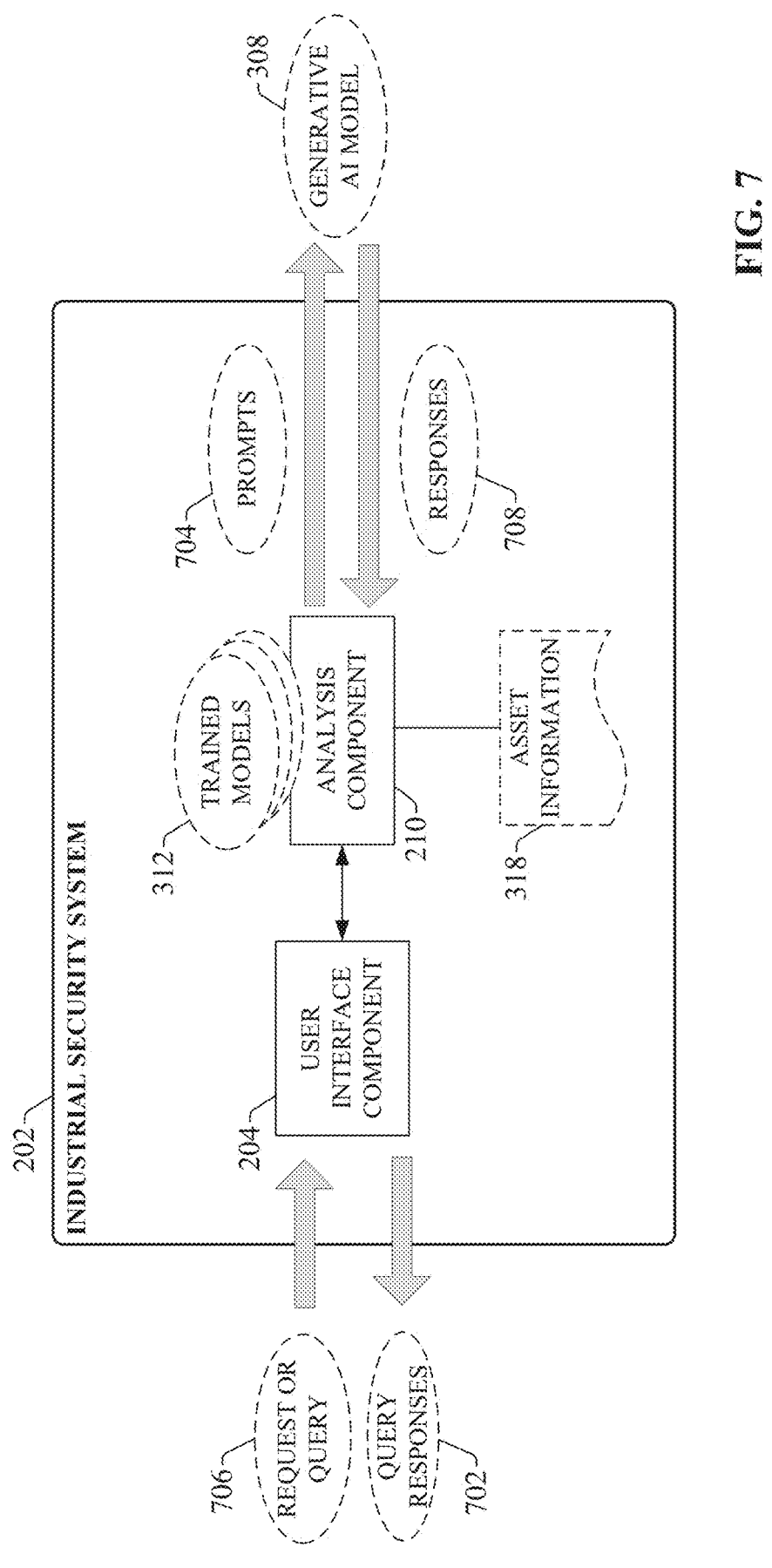
FIG. 7 is a diagram illustrating exchange of generative AI dialog messages between a user and the industrial security system.

In addition to, or as an alterative to, engaging with the industrial security system 202 via risk dashboards 602, some embodiments of the industrial security system 202 can support a generative AI chatbot interface through which a user can interact with the system 202 via natural language dialogs. FIG. 7 is a diagram illustrating exchange of generative AI dialog messages between a user and the industrial security system 202. Embodiments of the system 202 that support a generative AI-based chat interactions can render (via user interface component 204) a chat interface through which a user can exchange natural language prompts or chat conversations with the system 202. This chat interface can include a data entry field for entering a user's natural language request or query 706 as a text string, or can support other input formats for a user's request or query 706 (e.g., spoken-word audio input).

In general, the industrial security system 202 can receive and process a user's natural language requests or queries 706. These request or queries 706 can comprise, for example, questions about an industrial enterprise's security vulnerabilities or risks (e.g., "Where are my most critical vulnerabilities?", "Which of my facilities has the most security vulnerabilities?", "Do I have security vulnerabilities that would affect the #3 stamping press?", "How can I mitigate my most critical security risk?", etc.), requests for prioritized lists of recommended action items for addressing the enterprise's vulnerabilities (e.g., "What are my top 10 vulnerabilities and how should I mitigate?"), requests to deploy a patch 502 to a specified industrial asset 302 to eliminate a security vulnerability on that asset, questions regarding the best ways to spend capital on reducing security vulnerabilities, (e.g., "How should I spend my remaining budget on improving cyber security?"), questions regarding specific security vulnerability information being rendered on the risk dashboard 602 (e.g., "How long has this vulnerability been a concern?", "What are the risks posed by this vulnerability?", etc.), or other such natural language submissions. The industrial security system 202 can use prompt engineering services to process these natural language requests or queries 706 submitted by the user via the chat interface (or via a spoken word interface). These prompt engineering services can leverage knowledge encoded in the trained modules 312 (as learned from training data 402), together with responses 708 prompted from the generative AI model 308, to accurately ascertain the user's needs and respond to the user's request or query 706.

When a user submits a natural language request or query 706 to the system 202, the analysis component 210 can analyze the query 706 based on the documented asset information 318 as well as any of the training data 402 encoded in the trained models 312 (e.g., vendor vulnerability information, technical documentation for the assets 302 recorded in the asset information 318, etc.). Based on this analysis, and depending on the nature of the request or query 706, the analysis component 210 generates and returns a natural language response 702 to the query 706 (e.g., an answer to a question about asset vulnerabilities, an answer to a question about security vulnerability information being rendered on the risk dashboard 602, a recommendation regarding prioritization of risk mitigation actions to be performed to most effectively reduce overall risk, etc.). The analysis component 210 can also instruct the patch deployment component 214 to deploy patches 502 or take other remote remedial actions on specified assets 302 in accordance with a user's natural language request to perform such actions (e.g., "Apply your recommended countermeasure on the controller for #5 Tooling Line.").

In addition to referencing the information contained in the trained models 312 or asset information 318, the analysis component 210 can also, as needed, prompt the generative AI model 308 for responses 708 that assist in generating suitable responses 702 or deploying patches 502 in response to the user's natural language request or query 706. For example, in response to receipt of a natural language request or query 706, the analysis component 210 can determine whether a sufficiently accurate response 702 to the query 706 can be generated based on relevant information contained in the asset information 318 and trained models 312 alone, or, alternatively, whether supplemental information from the generative AI model 308 is necessary to formulate a response 702 having a sufficiently high probability of satisfying the user's request or query 706. If supplemental information from the generative AI model 308 is deemed necessary, the analysis component 210 can formulate prompts 704 based on analysis of the request or query 706 and the knowledge encoded in any of the trained models 312 and asset information 318. These prompts 704 are designed to obtain responses 708 from the generative AI model 308 that can be used to formulate accurate and cohesive responses 702 to the user's query 706.

For example, in the case of formulating responses 702 to a user's question about a security vulnerability currently being displayed on the risk dashboard 602 (see FIG. 6), the analysis component 210 can formulate the prompt 704 to include information from the query 706 as well as subsets of the asset information 318 or information from the trained models 312 determined to be relevant to the query 706 (e.g., technical specifications for the affected asset 302, a description of the vulnerability to which the query 706 is directed, a function of the affected asset 302 within the user's plant operations, etc.) and submit this prompt 704 to the generative AI model 308. The generative AI model 308 can process this prompt 704 and return a corresponding response 708 comprising relevant supplemental or contextual information that can be used by the analysis component 210 to formulate a response 702 having a high probability of satisfying the user's query 706.

In some embodiments, the industrial security system 202 can leverage the techniques described above to assess an industrial enterprise's network diagrams for potential security vulnerabilities or deviations from defined vertical-specific safety or design standards. For example, a user may submit digitized network diagrams or other types of engineering documentation in a suitable digitized format (e.g., portable document format (PDF) documents, computer-assisted design (CAD) files, etc.), and the analysis component 210 can analyze the content of this network documentation together with information regarding relevant industrial safety or design standards (as obtained from the trained models 312 or associated training data 402) and, if needed, responses 406 prompted from the generative AI model 308. Based on this analysis, the analysis component 210 can identify portions of the network architecture or control system design that violate relevant industrial design or safety standards, and determine possible design corrections that would bring the systems represented by the diagrams into compliance. The user interface component 204 can render explanations of the discovered standards deviations, graphically identify portions of the diagrams that should be redesigned for compliance, and render natural language explanations of the steps that should be taken to implement the recommended re-configuration of the design.

The industrial security system 202 described herein can substantially automate the process of discovering security vulnerabilities or active security threats within an industrial manufacturing environment. This can ensure that insights into potential security issues are discovered before those issues become critical. Since the system 202 inventories each customer's specific collection of industrial assets and automation systems, the industrial security system 202 can customize risk detection and mitigation to each customer's unique environment. The system 202 can also close the loop on risk mitigation by automatically applying suitable patches, reconfigurations, or control adjustments to eliminate discovered vulnerabilities, thereby reducing the amount of time required by human operators to identify and remediate security anomalies.

FIGS. 8-10*b* illustrate example methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates an example methodology 800 for discovering and remedying security vulnerabilities within an industrial environment. Initially, at 802, industrial asset data is collected from industrial assets deployed at one or more plant facilities of an industrial enterprise. This industrial asset data can comprise the identities of the assets (including, for example, asset names, model numbers, vendors, or other such identifying information) as well as configuration information for the respective assets. This configuration information can include, for example, network addresses, network settings, mode settings, communication parameters, data port settings, I/O configuration settings, machine access control (MAC) addresses, or other such configuration information. At 804, the identities and configuration of the industrial assets, as determined from the asset data collected at step 802, are documented as asset information. This asset information is maintained in association with the industrial enterprise that owns the assets. The system can maintain multiple segregated sets of asset information for respective different industrial enterprises or customers for use in analyzing and monitoring each customer's industrial assets for security vulnerabilities.

At 806, a determination is made as to whether one or more of the industrial assets are susceptible to a security vulnerability based on analysis of the asset information documented at step 804, data contained in one or more trained models (or otherwise stored in a database or knowledgebase), and a response prompted from a generative AI model. The data contained in the training models can include, for example, knowledge or technical specifications of industrial assets, machines, and devices; information defining industrial standards; information regarding recommended best practices for industrial design or safety; asset information obtained from vendor knowledgebases (including information published by vendors of industrial assets regarding known security issues with their products); technical specifics or design standards for various types of industrial control applications; knowledge of specific industrial verticals; control design rules; or other such data. In the case of responses prompted from a generative AI model, the system can, as needed formulate and submit prompts to the generative AI model designed to obtain responses 406 that can assist in determining whether the communication and functional architecture of the industrial assets or their configurations are indicative of a potential security vulnerability or cyber attack.

At 808, if no vulnerability is detected based on the analysis of step 806 (NO at step 808), the methodology continues to monitor and analyze the collected asset data for possible conditions indicative of a security vulnerability. This can involve monitoring the industrial asset data on a substantially real-time basis in view of the trained models (and leveraging responses prompted from the generative AI model as needed) to assess for security concerns substantially continuously. If a vulnerability is detected (YES at step 808), the methodology proceeds to step 810, where a remedial action predicted to mitigate the risk posed by the detected security vulnerability is determined. The remedial action can be determined, for example, based on reference to published vendor information regarding countermeasures for the detected vulnerability, recommendations prompted from the generative AI model, common configuration settings for similar assets known to mitigate the vulnerability, or other such information. At 812, the remedial action determined at step 810 is deployed to one or more of the industrial assets to mitigate the security vulnerability. Example remedial actions include, but are not limited to, modification of an asset's access permissions, updating an asset's digital certificates or key-based security, modifying an asset's network address, updating an asset's firmware version, modifying an asset's configuration settings, modifying firewall parameters, modifying whitelists, or implementing other such risk mitigation actions.

Figure 9A:
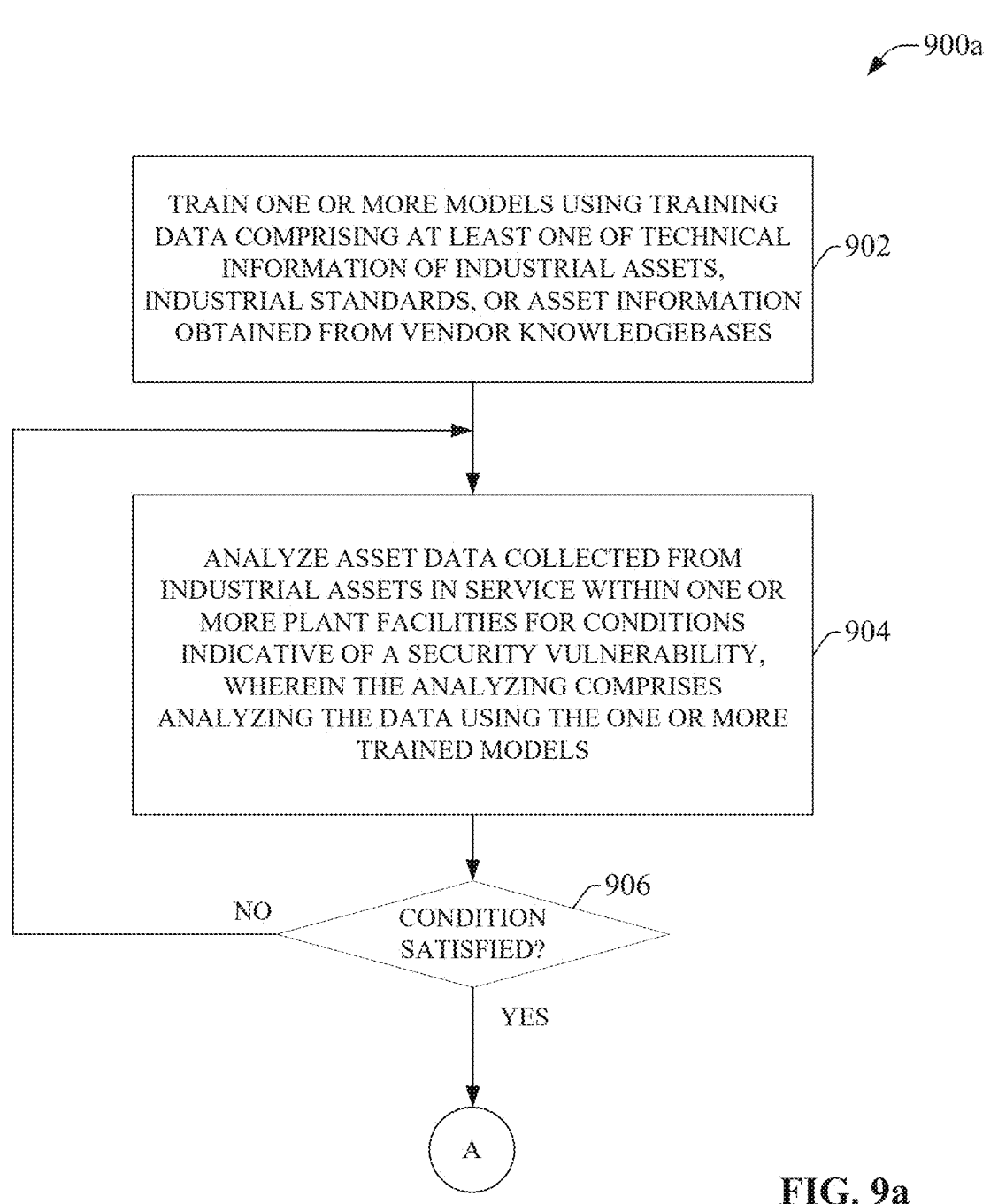
FIG. 9a is a flowchart a first part of an example methodology for leveraging generative AI in connection with monitoring industrial assets for security vulnerabilities and implementing automated countermeasures for mitigating risks posed by these vulnerabilities.
Figure 9B:
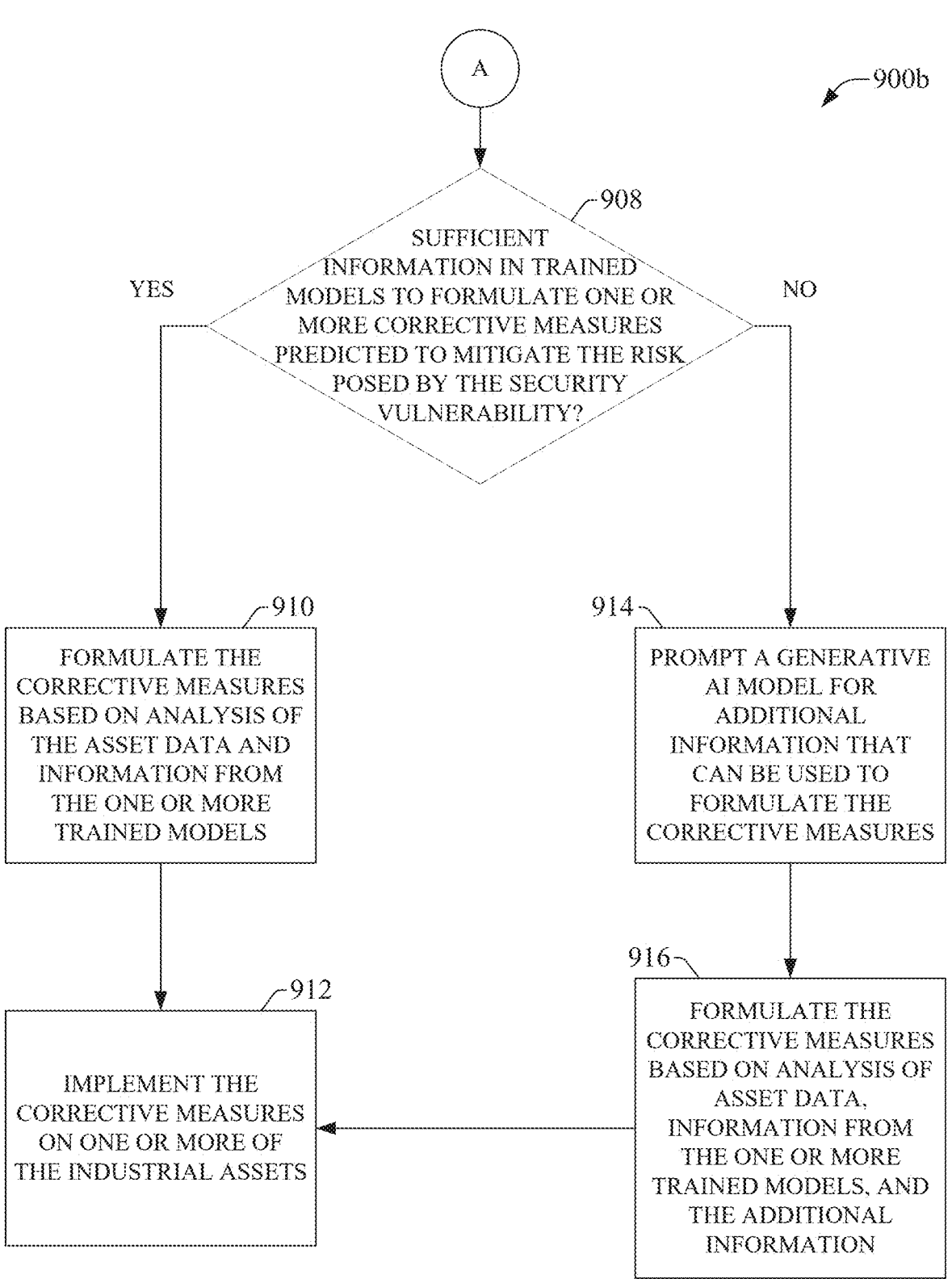
FIG. 9b is a flowchart a second part of the example methodology for leveraging generative AI in connection with monitoring industrial assets for security vulnerabilities and implementing automated countermeasures for mitigating risks posed by these vulnerabilities.
Figure 10B:
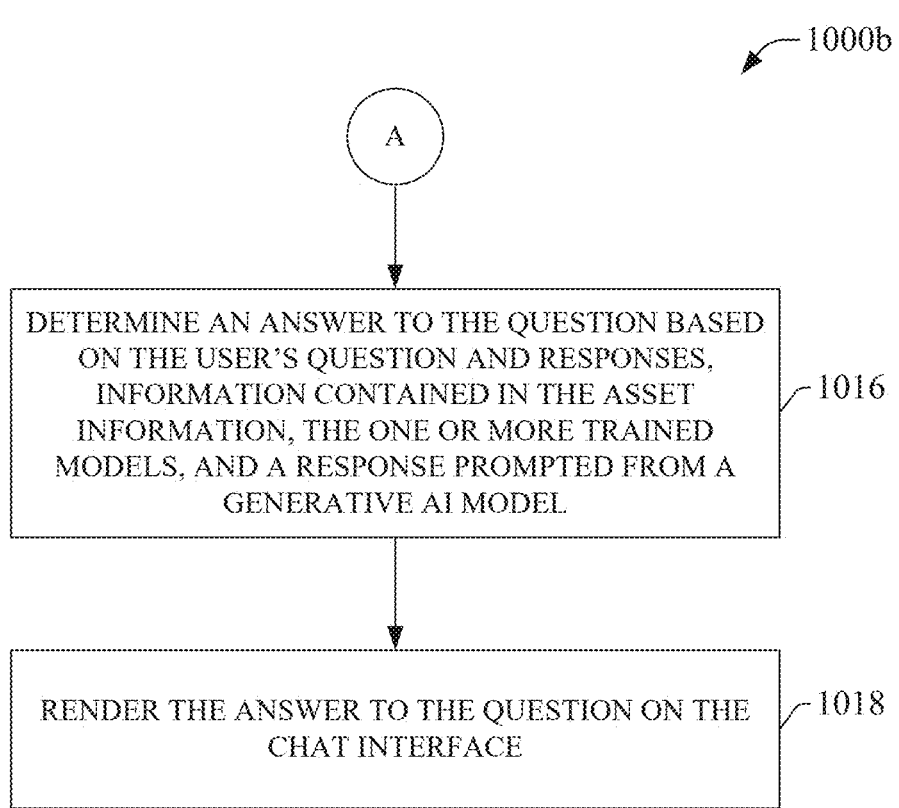
FIG. 10b is a flowchart a second part of the example methodology for interacting with an industrial security system via a generative AI chatbot.

FIG. 9a illustrates a first part of an example methodology 900a for leveraging generative AI in connection with monitoring industrial assets for security vulnerabilities and implementing automated countermeasures for mitigating risks posed by these vulnerabilities. Initially, at 902, one or more models are trained using training data that includes at least one of technical information for different types, models, and vendors of industrial assets, industrial standards, or published asset information obtained from vendor knowledgebases (which can include published information regarding known security vulnerabilities or recommended asset configurations for secure networking or communications). As an alternative to training models, the training data can be maintained in a knowledgebase or another data store where the data can be accessed in connection with identifying industrial security vulnerabilities. At 904, asset data collected from industrial assets that are in service within one or more plant facilities of an industrial enterprise are analyzed for conditions indicative of a security vulnerability, where this analysis involves analyzing the asset data using the information contained in the models trained at step 902. This asset data can include, for example, data values read from the assets' data tags; data from analog or digital sensors, data from telemetry devices or meters, alarm information, model and vendor information, device configuration information, MAC addresses, monitored network data traffic information, or other such data.

At 906, a determination is made, based on the analysis of step 904, as to whether the condition indicative of a security vulnerability is satisfied. If such a condition is not satisfied (NO at step 906), the methodology returns to step 904 and monitoring of the asset data continues. Alternatively, if a condition is satisfied (YES at step 906), the methodology proceeds to the second part 900b illustrated in FIG. 9b.

At 908, a determination is made as to whether the trained models contain sufficient information to formulate one or more corrective measures having a high probability of mitigating the risk posed by the security vulnerability discovered at step 906. If sufficient information is contained in the models (YES at step 908), the methodology proceeds to step 910, where one or more corrective measures predicted to mitigate the risk are formulated based on analysis of the asset data and relevant information from the one or more trained models (e.g., corrective measures similar to those described above in connection with step 810 of methodology 800). At 912, the corrective measures are implemented on one or more of the industrial assets.

Alternatively, if the information contained in the trained models is not sufficient for formulating corrective measures predicted to have a high probability of mitigating the risk (NO at step 908), the methodology proceeds to step 914, where a generative AI model is prompted for additional information that can be used to formulate the corrective measures. In this regard, the system can generate a suitable prompt directed to the generative AI model and designed to obtain information relevant to the discovered security vulnerability and potential remedial actions for addressing the vulnerability. This prompt can contain any relevant information that can assist in yielding relevant information, including but not limited to an identity, name, type, or description of the industrial asset experiencing the vulnerability; a description of the discovered security issue, or other such information. At 916, one or more corrective measures for mitigating the risk are generated based on analysis of the asset data, relevant information from the trained models, and the additional information prompted from the generative AI model. The methodology then proceeds to step 912, where the corrective measures are implemented on one or more of the industrial assets.

FIG. 10a illustrates a first part of an example methodology 1000a for interacting with an industrial security system via a generative AI chatbot. Initially, at 1002, one or more models are trained using training data comprising at least one of technical information for industrial assets, information regarding industrial standards, or asset information obtained form vendor knowledgebases (similar to step 902 of methodology 900a). At 1004, industrial asset data is collected from industrial assets deployed at one or more plant facilities of an industrial enterprise (similar to step 802 of methodology 800). At 1006, the identities and configurations of the industrial assets are documented as asset information based on the asset data collected at step 1004 (similar to step 804 of methodology 800).

At 1006, a natural language question regarding security vulnerabilities affecting the industrial assets is received via a chat interface. This initial question may be worded at any level of detail or granularity, and may comprise, for example questions about an industrial enterprise's security vulnerabilities or risks, requests for prioritized lists of recommended action items for addressing the enterprise's vulnerabilities, requests to deploy a patch or other remedial action to a specified industrial asset to eliminate a security vulnerability on that asset, questions regarding the best ways to spend capital on reducing security vulnerabilities, questions regarding specific security vulnerability information being presented by the system, or other such natural language questions.

At 1010, a determination is made as to whether sufficient information can be inferred from the question to yield a response to the question having a sufficiently high probability of accurately addressing the user's question regarding security vulnerabilities, or alternatively if more information is needed from the user in order to generate an accurate response satisfying the user's query. If additional information is required (YES at step 1010), the methodology proceeds to step 1012, where the system determines the additional information required, and renders a natural language prompt designed to guide the user toward providing the additional information. At 1014, a response to the prompt generated at step 1012 is received via the chat engine.

Steps 1010-1014 are repeated as a natural language dialog with the user until sufficient information translatable to an accurate response to the question received at step 1008 has been obtained. When no further information is required from the user (NO at step 1010), the methodology proceeds to the second part 1000b illustrated in FIG. 10b. At 1016, an answer to the question received at step 1008 is generated based on the user's initial question, subsequent information received from the user at step 1014, subsets of the asset information relevant to the question, and a response prompted from a generative AI model.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 11:
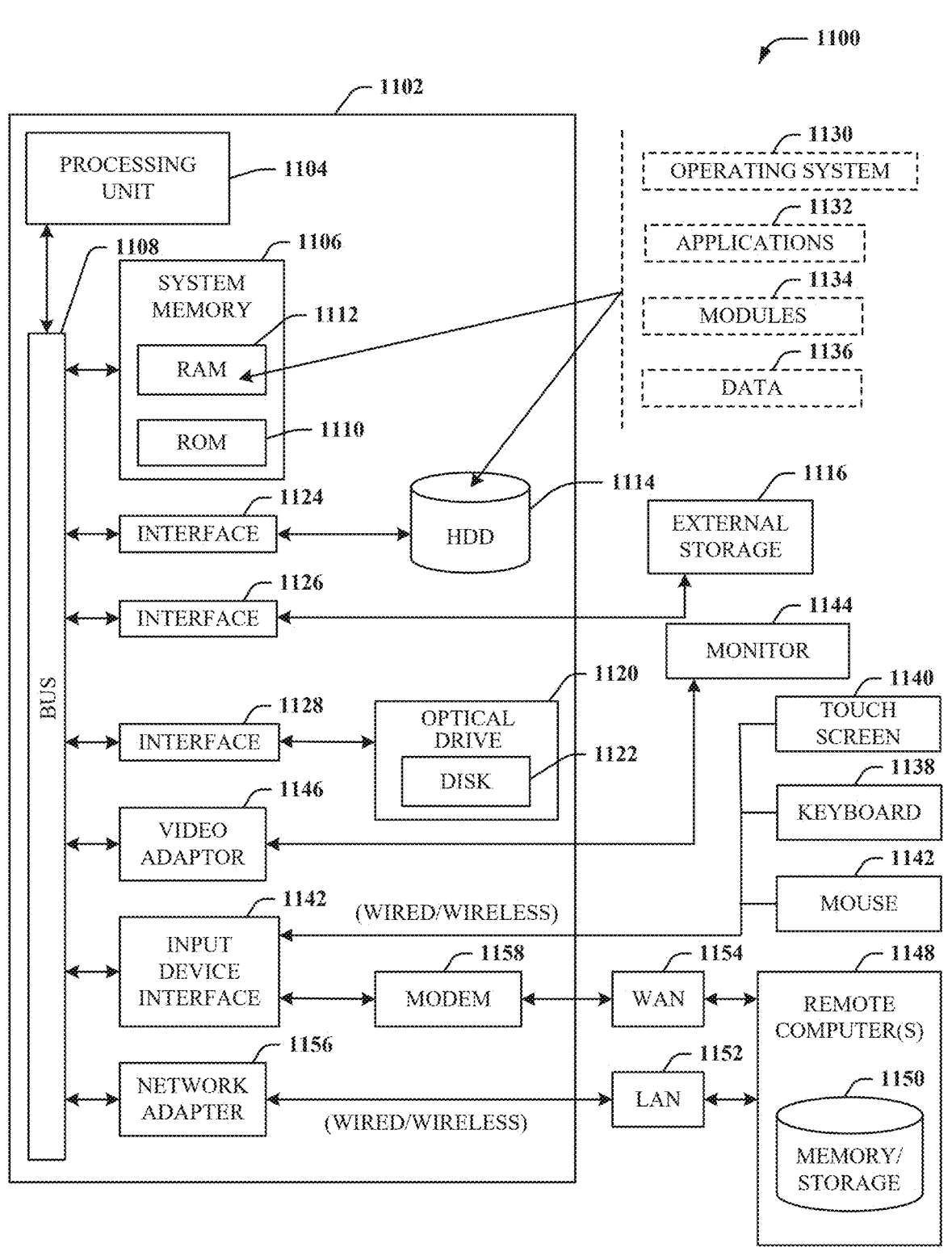
FIG. 11 is an example computing environment.
Figure 12:
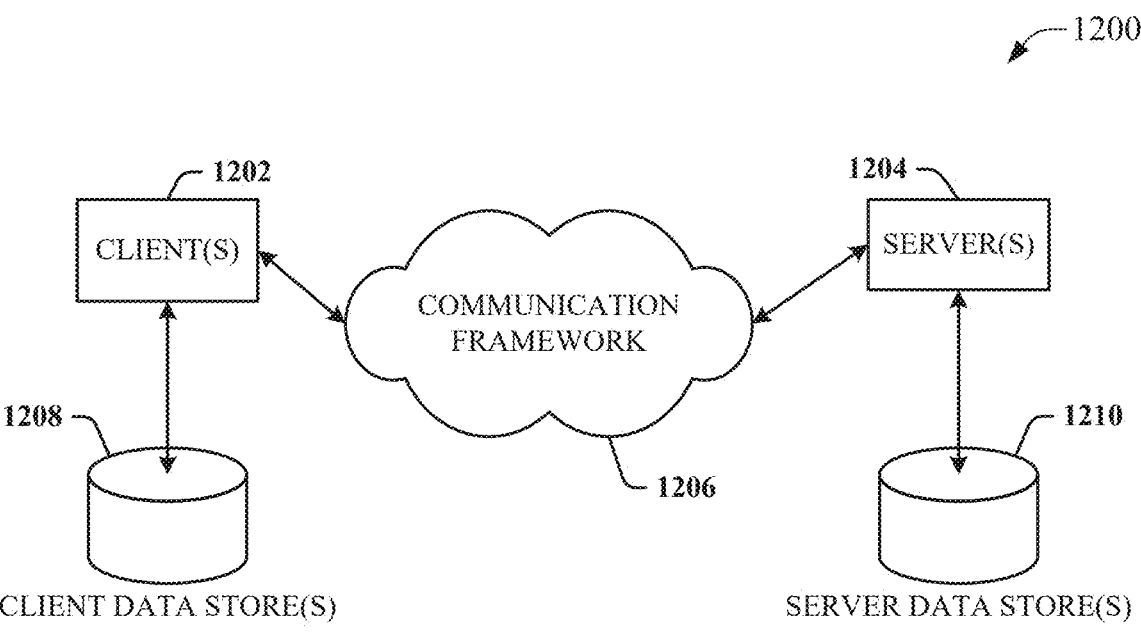
FIG. 12 is an example networking environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11 the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for application programs 1132. Runtime environments are consistent execution environments that allow application programs 1132 to run on any operating system that includes the runtime environment. Similarly, operating system 1130 can support containers, and application programs 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the adapter 1156 in a wireless mode.

When used in a WAN networking environment, the computer 1102 can include a modem 1158 or can be connected to a communications server on the WAN 1154 via other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1152 or WAN 1154 e.g., by the adapter 1156 or modem 1158, respectively. Upon connecting the computer 1102 to an associated cloud storage system, the external storage interface 1126 can, with the aid of the adapter 1156 and/or modem 1158, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components; and
a processor, operatively coupled to the memory, that executes the executable components, the executable components comprising:
a device interface component configured to collect industrial asset data generated by industrial assets in service within an industrial facility, wherein the industrial asset data comprises identity and configuration information for the industrial assets;
an analysis component configured to
determine, based on analysis of the industrial asset data, whether a subset of the industrial asset data satisfies a condition indicative of a security vulnerability, and
in response to determining that the subset of the industrial data satisfies the condition, formulate, based on the analysis of the industrial data and a model trained with training data, a remedial action predicted to mitigate a risk associated with the security vulnerability, wherein the training data comprises at least technical specifications of the industrial assets; and
a user interface component configured to render, on a client device, information about the security vulnerability and a description of the remedial action,
wherein the analysis component is configured to, in response to determining that the model does not comprise sufficient information to formulate the remedial action, generate a prompt, directed to a generative artificial intelligence (AI) model, designed to obtain a response from the generative AI model that is used by the analysis component to formulate the remedial action.

2. The system of claim 1, further comprising a discovery component configured to discover identities and configurations the industrial assets based on analysis of the industrial asset data and to record the identities and configurations as asset information,
wherein the analysis component is configured to perform the analysis based on the asset information.

3. The system of claim 1, wherein the training data further comprises at least one of information defining industrial standards; information regarding recommended best practices for industrial design or safety, asset information obtained from vendor knowledgebases, technical specifics or design standards for different types of industrial control applications, knowledge of specific industrial verticals, or control design rules.

4. The system of claim 3, wherein the analysis component is configured to generate the prompt to include at least one of a selected subset of the industrial asset data or a selected subset of the training data.

5. The system of claim 3, wherein
the user interface is further configured to render a chat interface configured to receive a natural language query directed to security vulnerabilities, including the security vulnerability, detected by the analysis component, and
the analysis component is configured to generate a natural language response to the natural language query based on analysis of the natural language query, a selected subset of the training data, and a response prompted from the generative AI model.

6. The system of claim 1, wherein the security vulnerability comprises at least one of an outdated firmware version installed on an industrial asset, of the industrial assets, that leaves the industrial asset vulnerable to unauthorized access; a device configuration setting on the industrial asset that that leaves the industrial asset vulnerable to unauthorized access; or an insecurity in a network architecture design of a plant network on which the industrial assets operate that can allow access to the industrial assets by unauthorized parties.

7. The system of claim 1, wherein the remedial action is at least one of installation of new software on an industrial asset of the industrial assets, modification of a device configuration setting on the industrial asset, modification of an asset permission for the industrial asset, modification of a digital certificate on the industrial asset, modification of key-based security for the industrial asset, modification of a network address of industrial asset, an update of the industrial asset's firmware, modification of a firewall parameter for a plant network on which the industrial assets operate, or modification of a whitelist.

8. The system of claim 7, further comprising a patch deployment component configured to implement the remedial action in response to a determination by the analysis component that the subset of the industrial asset data satisfies the condition indicative of the security vulnerability.

9. The system of claim 1, wherein
the analysis component is further configured to determine a level of risk associated with the security vulnerability, and
the information about the security vulnerability rendered by the user interface component comprises the level of risk.

10. The system of claim 1, wherein the information about the security vulnerability rendered by the user interface component comprises at least one of a description of the security vulnerability, an identity of an industrial asset affected by the security vulnerability, a description of a manufacturing risk posed by the vulnerability, a description of a safety risk posed by the security vulnerability, or a predicted cost associated with the security vulnerability.

11. A method, comprising:

collecting, by a system comprising a processor, industrial asset data from industrial assets operating within an industrial plant, wherein the industrial asset data comprises identity and configuration information for the industrial assets;

determining, by the system based on analysis of the industrial asset data, whether a subset of the industrial asset data satisfies a condition indicative of a security vulnerability;

in response to determining that the subset of the industrial data satisfies the condition, determining, by the system, based on the analysis of the industrial data and a model trained with training data, a remedial action predicted to mitigate a risk associated with the security vulnerability, wherein the training data comprises at least technical specifications of the industrial assets; and rendering, by the system on a client device, information about the security vulnerability and a description of the remedial action, wherein the determining of the remedial action comprises, in response to determining that the model does not comprise sufficient information to determine the remedial action, generating a prompt, directed to a generative artificial intelligence (AI) model, designed to obtain a response from the generative AI model that is used by the system to determine the remedial action.

12. The method of claim 11, further comprising:

discovering, by the system, identities and configurations the industrial assets based on analysis of the industrial asset data; and recording, by the system, the identities and configurations as asset information, wherein the determining of whether the subset of the industrial asset data satisfies the condition comprises performing the analysis on the industrial asset data and the asset information.

13. The method of claim 11, wherein the training data further comprises at least one of information defining industrial standards, information regarding recommended best practices for industrial design or safety, asset information obtained from vendor knowledgebases, technical specifics or design standards for different types of industrial control applications, knowledge of specific industrial verticals, or control design rules.

14. The method of claim 13, wherein the generating of the prompt comprises generating the prompt to include at least one of a selected subset of the industrial asset data or a selected subset of the training data.

15. The method of claim 11, further comprising:

receiving, by the system via a chat interface, a natural language query regarding security vulnerabilities, including the security vulnerability, detected by the system, and in response to the receiving of the natural language query, generating, by the system, a natural language response to the natural language query based on analysis of the natural language query, a selected subset of the training data, and a response prompted from the generative AI model.

16. The method of claim 11, wherein the security vulnerability comprises at least one of an outdated firmware version installed on an industrial asset, of the industrial assets, that leaves the industrial asset vulnerable to unauthorized access; a device configuration setting on the industrial asset that that leaves the industrial asset vulnerable to unauthorized access; or an insecurity in a network architecture design of a plant network on which the industrial assets operate that can allow access to the industrial assets by unauthorized parties.

17. The method of claim 11, wherein the remedial action is at least one of installation of new software on an industrial asset of the industrial assets, modification of a device configuration setting on the industrial asset, modification of an asset permission for the industrial asset, modification of a digital certificate on the industrial asset, modification of key-based security for the industrial asset, modification of a network address of industrial asset, an update of the industrial asset's firmware, modification of a firewall parameter for a plant network on which the industrial assets operate, or modification of a whitelist.

18. The method of claim 17, further comprising implementing, by the system, the remedial action in response to determining that the subset of the industrial data satisfies the condition.

19. A non-transitory computer-readable medium having stored thereon instructions that, in response to execution, cause a system comprising a processor to perform operations, the operations comprising:

collecting industrial asset data from industrial assets operating within an industrial plant, wherein the industrial asset data comprises identity and configuration information for the industrial assets;

determining, based on analysis of the industrial asset data, whether a subset of the industrial asset data satisfies a condition indicative of a security vulnerability;

in response to determining that the subset of the industrial data satisfies the condition, formulating, based on the analysis of the industrial data and a model trained with training data, a remedial action predicted to mitigate a risk associated with the security vulnerability, wherein the training data comprises at least technical specifications of the industrial assets; and rendering, on a client device, information about the security vulnerability and a description of the remedial action, wherein the formulating of comprises, in response to determining that the model does not comprise sufficient information to formulate the remedial action, generating a prompt, directed to a generative artificial intelligence (AI) model, designed to obtain a response from the generative AI model that is used by the system to formulate the remedial action.

20. The non-transitory computer-readable medium of claim 19, further comprising:

discovering identities and configurations the industrial assets based on analysis of the industrial asset data; and recording the identities and configurations as asset information, wherein the determining of whether the subset of the industrial asset data satisfies the condition comprises performing the analysis on the industrial asset data and the asset information.

* * * * *